(12) United States Patent
Kim

(10) Patent No.: US 9,906,841 B2
(45) Date of Patent: Feb. 27, 2018

(54) DISPLAY APPARATUS, AND METHOD AND APPARATUS FOR SETTING UP AND CONTROLLING THE SAME

(71) Applicant: SAMSUNG ELECTRONICS CO., LTD., Suwon-si (KR)

(72) Inventor: Wan-su Kim, Anyang-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/254,082

(22) Filed: Apr. 16, 2014

(65) Prior Publication Data

US 2014/0310742 A1    Oct. 16, 2014

(30) Foreign Application Priority Data

Apr. 16, 2013  (KR) .................. 10-2013-0041759
Jul. 29, 2013  (KR) .................. 10-2013-0089621
Mar. 11, 2014  (KR) .................. 10-2014-0028479

(51) Int. Cl.
| | |
|---|---|
| H04N 7/16 | (2011.01) |
| H04N 21/485 | (2011.01) |
| H04N 21/258 | (2011.01) |
| H04N 21/422 | (2011.01) |
| H04N 21/45 | (2011.01) |
| H04N 21/4363 | (2011.01) |
| H04N 21/41 | (2011.01) |
| H04N 21/443 | (2011.01) |

(52) U.S. Cl.
CPC ..... *H04N 21/485* (2013.01); *H04N 21/25833* (2013.01); *H04N 21/25858* (2013.01); *H04N 21/4126* (2013.01); *H04N 21/42204* (2013.01); *H04N 21/43637* (2013.01); *H04N 21/4516* (2013.01); *H04N 21/4113* (2013.01); *H04N 21/4432* (2013.01)

(58) Field of Classification Search
CPC ................... H04N 21/4532; H04N 21/4751
USPC ....... 725/28, 30, 33, 34, 40, 60, 68, 80, 116, 725/134, 133
See application file for complete search history.

(56) References Cited

U.S. PATENT DOCUMENTS

| | | |
|---|---|---|
| 7,089,550 B2 | 8/2006 | Bakke et al. |
| 8,233,090 B2 | 7/2012 | Chun |
| 2004/0073915 A1* | 4/2004 | Dureau .............. 725/9 |

(Continued)

FOREIGN PATENT DOCUMENTS

| | | |
|---|---|---|
| JP | 2009-70189 A | 4/2009 |
| JP | 2012-129860 A | 7/2012 |

(Continued)

OTHER PUBLICATIONS

Communication dated Aug. 20, 2014, issued by the International Searching Authority in counterpart International Application No. PCT/KR2014/003187.

*Primary Examiner* — Jivka Rabovianski
(74) *Attorney, Agent, or Firm* — Sughrue Mion, PLLC

(57) ABSTRACT

Disclosed are a display apparatus, and a method and an apparatus for setting up and controlling the display apparatus. The display apparatus includes a communicator configured to receive setting profile data of the display apparatus from an external device, and a controller configured to parse the received setting profile data and perform setting of the display apparatus based on the parsed setting profile data.

22 Claims, 24 Drawing Sheets

(56) References Cited

U.S. PATENT DOCUMENTS

| | | |
|---|---|---|
| 2008/0196072 A1 | 8/2008 | Chun |
| 2010/0278515 A1 | 11/2010 | Shimazaki |
| 2012/0136721 A1 | 5/2012 | Ullah |
| 2012/0236208 A1 | 9/2012 | Chun |
| 2012/0240177 A1* | 9/2012 | Rose .......................... 725/116 |
| 2012/0252405 A1* | 10/2012 | Lortz ........................ G06F 8/60 |
| | | 455/410 |
| 2013/0107131 A1* | 5/2013 | Barnett ................. G08C 17/02 |
| | | 348/734 |
| 2013/0152152 A1* | 6/2013 | Benyola ........... H04N 21/25891 |
| | | 725/153 |
| 2013/0221084 A1* | 8/2013 | Doss ..................... H04W 12/06 |
| | | 235/375 |
| 2014/0129232 A1* | 5/2014 | Jones et al. ................... 704/275 |
| 2014/0181886 A1* | 6/2014 | Goodman ......... H04M 3/42042 |
| | | 725/133 |

FOREIGN PATENT DOCUMENTS

| | | |
|---|---|---|
| JP | 2012235346 A | 11/2012 |
| KR | 10-1121441 B1 | 3/2012 |
| KR | 1020120050955 A | 5/2012 |
| KR | 1020120084568 A | 7/2012 |

\* cited by examiner

FIG. 17
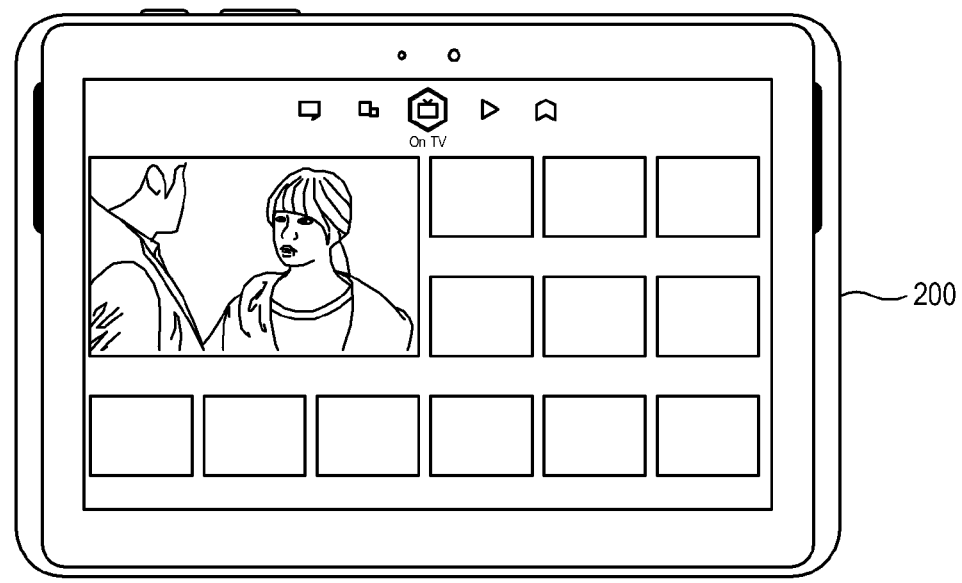

DISPLAY APPARATUS, AND METHOD AND APPARATUS FOR SETTING UP AND CONTROLLING THE SAME

CROSS-REFERENCE TO RELATED APPLICATIONS

This application claims priority from Korean Patent Applications No. 10-2013-0041759, filed on Apr. 16, 2013, No. 10-2013-0089621, filed on Jul. 29, 2013, and No. 10-2014-0028479, filed on Mar. 11, 2014, in the Korean Intellectual Property Office, the disclosures of which are incorporated herein by reference in their entireties.

BACKGROUND

Field

Apparatuses and methods consistent with exemplary embodiments relate to a display apparatus, and a method and an apparatus for setting up and controlling the same, and more particularly, to a display apparatus capable of being initially set up using a near field communication (NFC) tag or a quick response (QR) mark, and a method and an apparatus for setting up and controlling the display apparatus using information included in the NFC tag or the QR code.

Description of the Related Art

Smart devices, for example, smart televisions (TVs) have been widely used. When a smart TV is first set up after purchase, a user needs to perform initial setting related to, for example, a language, a network access point (AP), a zip code, a switched virtual connection (SVC) provider, terms and conditions, channel settings, etc., through a TV screen.

In a general TV, a user may watch the TV without the initial setting, but the smart TV has many complicated items that require initial setting. The initial setting for the smart TV includes many items such as a network access point (AP), agreement to terms and conditions, account creation, country or region setting, channel setting, etc. Thus, the user may have difficulty in using the smart TV. Although a tutorial or the like for explaining basic functions of the smart TV may be provided, the tutorial shows only limited contents as a guide to the smart TV and it may be difficult for a user to understand the tutorial.

Also, the smart TV supports sound recognition and multi-brand remote (MBR) control (e.g., universal remote controller), but it may not be easy to perform smart TV setting through the sound recognition. Further, menus for setting the smart TV interrupts TV watching because the menus (e.g., setting image quality, volume, etc.) are shown as overlapping with a channel screen.

The smart TV setting needs to be performed when a new smart TV is purchased or when there is a change in use environments of the smart TV. In this case, it may be inconvenient for a user to perform the smart TV setting, which is complicated, whenever the new smart TV is purchased or there is a change in the use environments of the smart TV.

SUMMARY

One or more exemplary embodiments may provide a display apparatus of which settings may be easily performed through an external device such as a mobile device or a computer, and a method and an apparatus for setting up the same.

One or more exemplary embodiments may also provide a display apparatus and a method and an apparatus for setting up the same, in which a setting profile or a previous setting profile of the display apparatus is stored in a server or a mobile device such that setting of the display apparatus may be conveniently and easily performed by downloading the setting profile.

One or more exemplary embodiments may further provide a display apparatus and a method and an apparatus for setting up the same, in which setting of the display apparatus may be performed using a quick response (QR) code or a near field communication (NFC) tag.

According to an aspect of an exemplary embodiment, provided is a display apparatus including a communicator configured to receive setting profile data of the display apparatus from an external device, and a controller configured to parse the received setting profile data and perform setting of the display apparatus based on the parsed setting profile data.

The setting profile data may be generated based on a setting item input by a user to the external device.

The setting item may be input through at least one from among a webpage and an application for setting the display apparatus.

The setting item may include at least one from among account creation, router setting, language setting, receiving-type setting, external input-type setting, network-type setting, service-provider setting, agreement to terms and conditions, data compression-type setting, communication-type setting, channel setting, application setting and remote controller setting.

The external device may encode and transmit the setting profile data, and the controller may receive and decode the encoded setting profile data.

The external device may receive information from at least one from among a quick response (QR) code and a near field communication (NFC) tag.

The external device may receive location information of the at least one from among the application and the webpage for setting the display apparatus from the at least one from among the QR code and the NFC tag.

The external device may include a mobile device connected to the display apparatus through at least one from among Bluetooth pairing, Wi-Fi direct and wireless Internet.

The controller may control power of the display apparatus in response to a power control signal received from the mobile device.

The power control signal of the mobile device may be generated in response to a power control command of the display apparatus received from the NFC tag.

The controller may control the display apparatus or perform the setting of the display apparatus in response to a remote control signal received from the mobile device.

The display apparatus may further include a storage configured to store an application substantially the same as or compatible with an application installed in the mobile device.

The display apparatus may further include a display configured to display a screen for login with a user account to access the external device having the setting profile data.

The controller may request the external device to transmit the setting profile data in response to the login with the user account.

The setting profile data may be generated by the external device based on a setting item that is input by a user through at least one from among a webpage and an application for setting the display apparatus by using a setting item input device.

The setting item input device may include at least one from among a personal computer and a mobile device, and the external device may include a server.

According to an aspect of another exemplary embodiment, provided is a mobile device including a communicator configured to communicate with a display apparatus, a storage configured to store an application for setting the display apparatus, a user input section configured to receive a setting item for setting the display apparatus through the application, and a controller controlled to generate setting profile data based on the setting item received through the application, and transmit the generated setting profile data to at least one from among the display apparatus and a server.

The setting item may include at least one from among account creation, router setting, language setting, receiving-type setting, external input-type setting, network-type setting, service-provider setting, agreement to terms and conditions, data compression-type setting, communication-type setting, channel setting, application setting and remote controller setting.

The setting profile data may be encoded and transmitted to the display apparatus.

The mobile device may further include an information recognizer configured to receive information from at least one from among a quick response (QR) code and a near field communication (NFC) tag.

The information recognizer may receive location information of at least one from among an application and a webpage for setting the display apparatus from the at least one from among the QR code and the NFC tag.

The communicator may access the display apparatus through at least one from among Bluetooth pairing, Wi-Fi direct and wireless Internet.

The controller may transmit a power control signal to the display apparatus to control power of the display apparatus.

The power control signal may be generated in response to a power control command of the display apparatus received from the NFC tag.

The controller may remotely control the display apparatus or remotely set up the display apparatus by transmitting a remote control signal to the display apparatus.

The application may be substantially the same as or compatible with an application installed in the display apparatus.

The controller may transmit the setting profile in response to a request of the display apparatus.

According to an aspect of still another exemplary embodiment, provided is a mobile device including a communicator configured to communicate with a server and receive a webpage for setting a display apparatus, a user input section configured to receive a setting item for setting the display apparatus through the webpage, and a controller configured to instruct the server to generate setting profile data based on the setting item received through the webpage and to store the generated setting profile data according to a user.

According to an aspect of still another exemplary embodiment, provided is a method of setting up a display apparatus, the method including receiving setting profile data of the display apparatus from an external device, parsing the received setting profile data and performing setting of the display apparatus based on the parsed setting profile data.

According to an aspect of still another exemplary embodiment, provided is a non-transitory computer readable recording medium having embodied thereon at least one program comprising a command for performing the above method.

According to an aspect of still another exemplary embodiment, provided is a server, including: a communicator configured to communicate with a user terminal apparatus; and a controller configured to receive, from the user terminal apparatus, a setting item for setting an electronic apparatus, generate setting profile data based on the setting item, and transmit the setting profile data to the electronic apparatus, the electronic apparatus being communicatively coupled to the server.

BRIEF DESCRIPTION OF THE DRAWINGS

The above and/or other aspects will become apparent and more readily appreciated from the following description of exemplary embodiments, taken in conjunction with the accompanying drawings, in which:

FIG. 5 shows an initial screen when a smart TV is purchased and first turned on;

FIGS. 17 to 22 show examples of controlling a smart TV through a mobile device according to exemplary embodiments;

DETAILED DESCRIPTION

Certain exemplary embodiments will now be described in detail with reference to accompanying drawings. The following exemplary embodiments describe only configurations directly related to the present inventive concept, and the descriptions the other configurations will be omitted. However, it will be understood that the omitted configurations are not unnecessary in realizing an apparatus or system to which the inventive concept is applied. Further, like numerals refer to like elements throughout.

An electronic device for initial setting or control may, for example, include a display apparatus such as a smart television (TV), a mobile device, and home appliances such as an air conditioner, a refrigerator, an audio system, etc. Herein, a smart TV 100 will be described as an example of the display apparatus for illustrative purposes.

Setting of an electronic device may include initial setting first performed after the electronic device is purchased, use setting, and interim update for setting contents. A setting item may include, for example, at least one from among account creation, router (i.e., an access point (AP)) setting, language setting, receiving-type setting, external input-type setting, network-type setting, service-provider setting, agreement to terms and conditions, a remote-controller (e.g., multi-brand remote, MBR) setting, and application setting.

Remote control of the smart TV may include software or hardware control of the smart TV including, for example, power control of the smart TV, environment setting for the smart TV, control of contents displayed on the smart TV, channel setting and change of the smart TV, etc.

Figure 1:
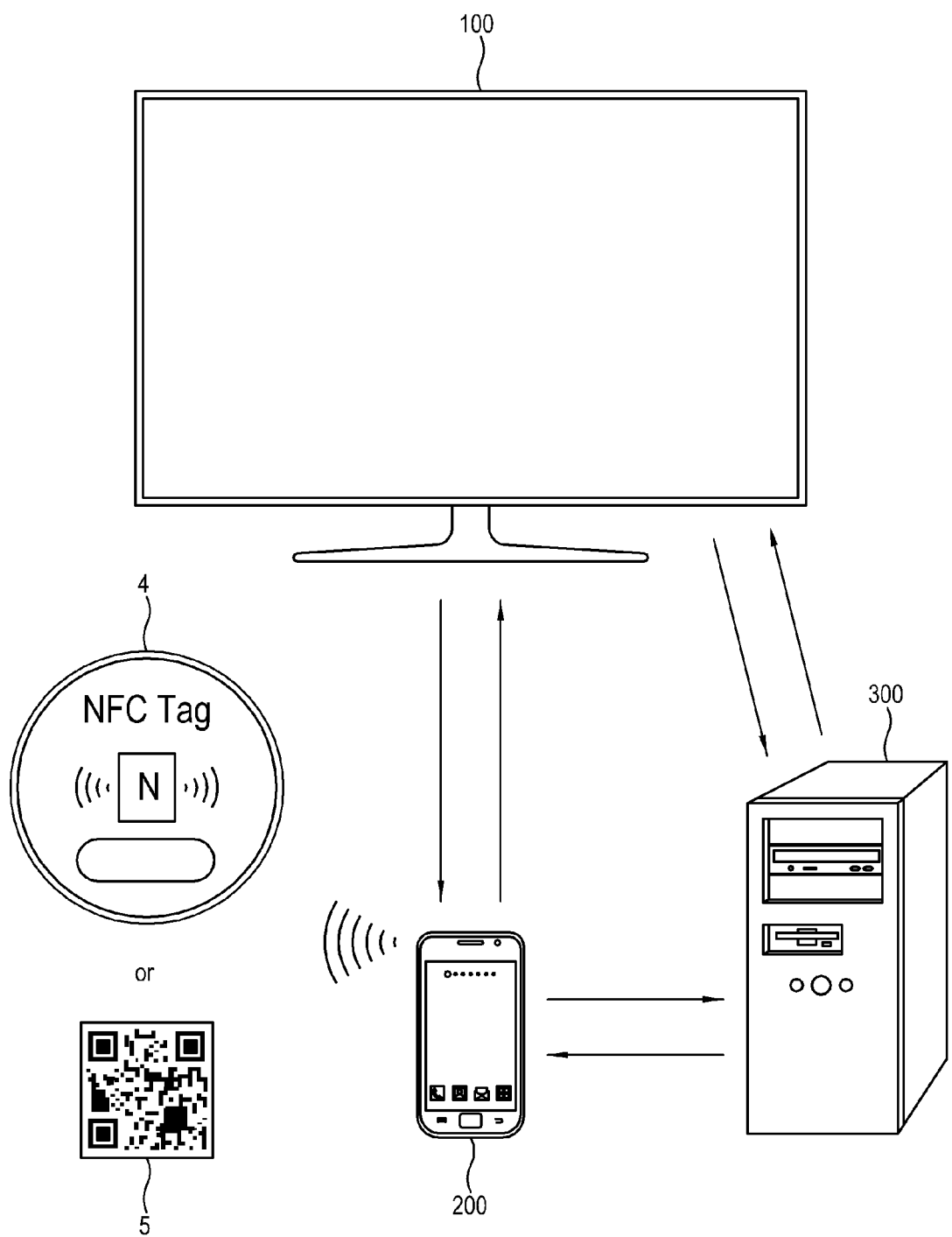
FIG. 1 schematically shows an initial setting and remote control system for a smart television (TV) according to an exemplary embodiment.

FIG. 1 schematically shows an initial setting and remote control system 1 for a smart TV a according to an exemplary embodiment. The initial setting and remote control system for the smart TV according to an exemplary embodiment may include a smart TV 100, a near field communication (NFC) tag 4 or a quick response (QR) code 5, a server 300, and a mobile device 200.

Figure 2:
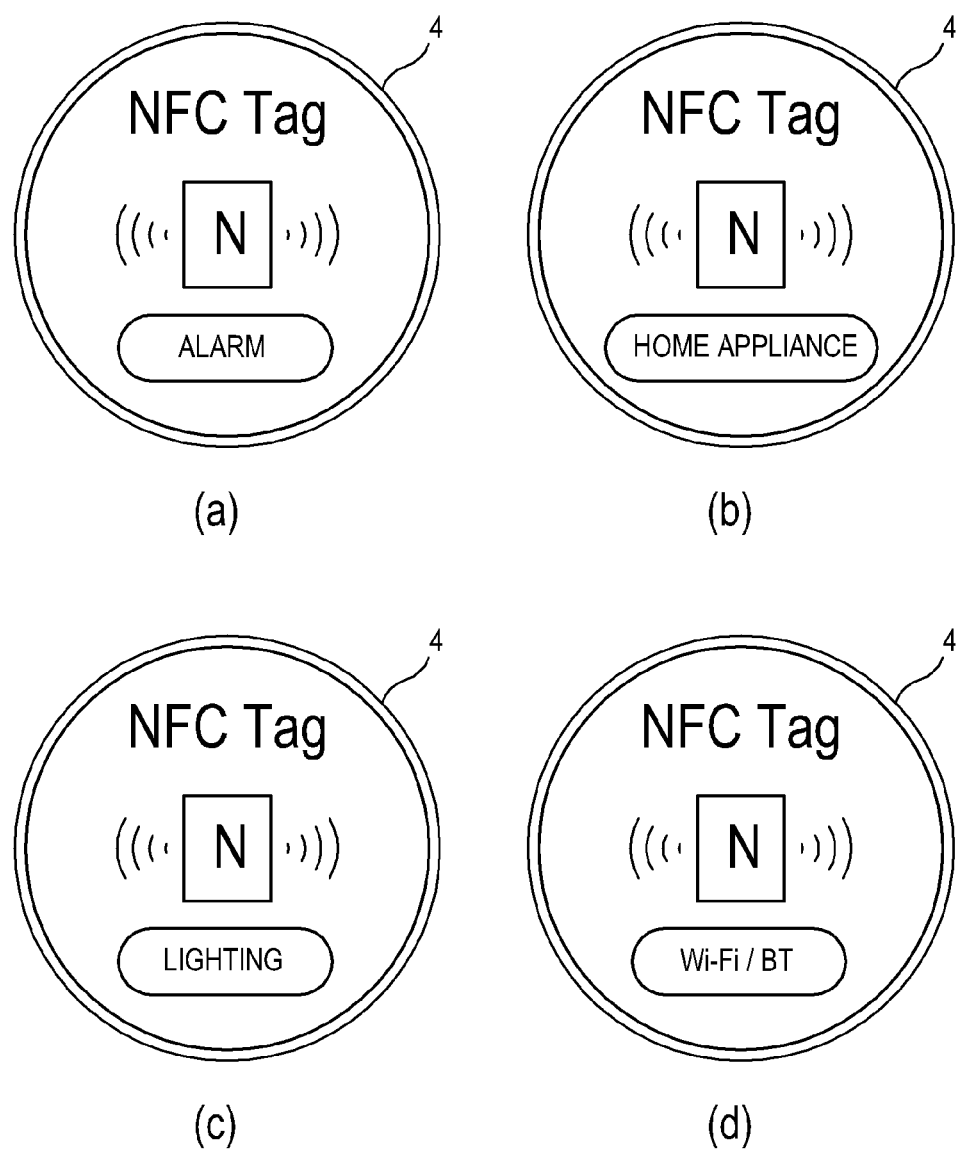
FIG. 2 shows examples of using a near field communication (NFC) tag by a mobile device according to exemplary embodiments.

FIG. 2 show examples of using the NFC tag 4 by the mobile device 200 according to exemplary embodiments.

The NFC tag 4 may be used in checking time of a user's leaving home, for example, going to work and time of a user's returning home. Further, alarm setting may be automatically performed by using the NFC tag 4 (refer to (a) in FIG. 2) instead of setting an alarm through an alarm setting screen, and a home appliance (refer to (b) of FIG. 2), lighting (refer to (c) in FIG. 2), and Wi-Fi/Bluetooth (refer to (d) in FIG. 2) may be turned on and off and set by the NFC tag 4.

The NFC tag 4 may store an application executing command to automatically execute a desired application of the mobile device 200. That is, when a user causes the mobile device 200 to approach or contact the NFC tag 4, the application executing command stored in the NFC tag 4 may be automatically transmitted to the mobile device 400 such that the desired application of the mobile device 200 may be executed. For example, when an address where an application for setting up the smart TV is located is stored in the NFC tag 4, the mobile device 200 may be automatically connected to a server (e.g., an App store) from which the corresponding application may be downloaded.

Similarly, the QR code 5 includes address information of the server (e.g., the App store) from which a setting application or a webpage of the smart TV 100 may be downloaded, such that location information of the setting application or the webpage may be obtained by reading the QR code 5 through the mobile device 200.

Figure 3:
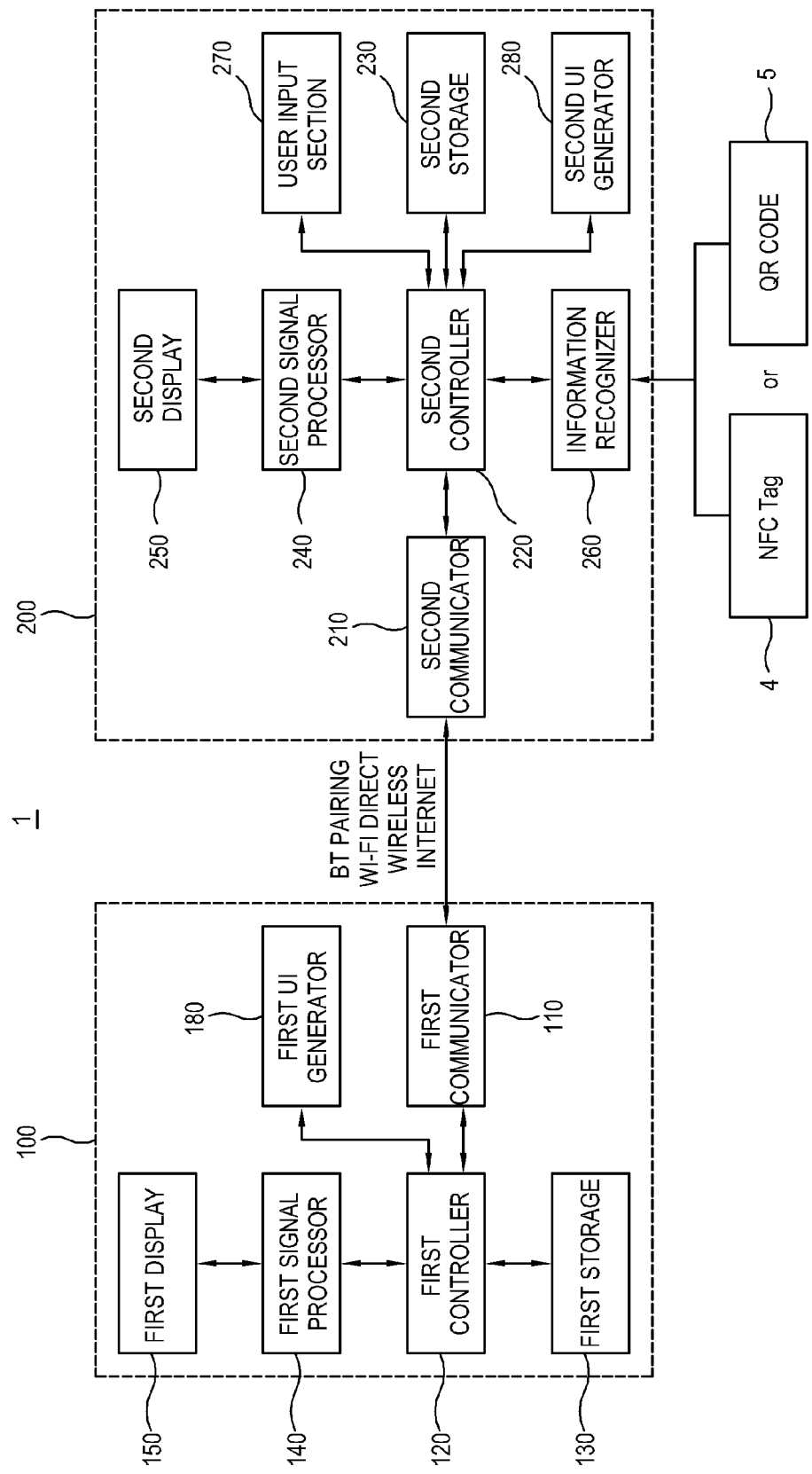
FIG. 3 shows a block diagram showing an initial setting and remote control system according to an exemplary embodiment.

FIG. 3 shows a block diagram showing an initial setting and remote control system according to an exemplary embodiment. As shown in FIG. 3, the initial setting and remote control system 1 according to an exemplary embodiment may include a smart TV 100, and a mobile device 200 as a user input device for setting the smart TV 100. In this embodiment, the mobile device 200 is regarded as an external device of the smart TV 100.

The smart TV 100 may include a first communicator 110 for communicating with an external device (e.g., the mobile device 200), a first storage 130 for storing data and programs, a first controller 120 for controlling elements of the smart TV 100, a first signal processor 140 for processing an input signal, a first display 150 for displaying the processed signal, and a user interface (UI) generator 180.

The first communicator 110 receives a signal corresponding to an external input and transmits the signal to the first signal processor 140 or the first controller 120. The first communicator 110 may connect with various external input cables and receive a signal from the corresponding external input through an external input cable, or may wirelessly receive a signal through a preset wireless communication standard.

The first communicator 110 may include a plurality of connectors (not shown) to which cables are respectively connected. The first communicator 110 may receive, from the connected external input, a signal including, for example, a broadcasting signal, an image signal, a data signal, etc. based on high definition multimedia interface (HDMI), universal serial bus (USB) and component standards or communication data through a communication network.

The first communicator 110 may further include not only elements for receiving a signal and/or data from the external input, but also various additional elements such as a wireless communication module (not shown) for wireless communication and a tuner (not shown) for receiving the broadcasting signal in accordance with a design specification of the smart TV 100. In addition to receiving the signal from the external device, the first communicator 110 may transmit information, data, or a signal to the external device. That is, the first communicator 110 is not limited to receiving the signal from the external device, but may provide an interface for interactive communication. The first communicator 110 may receive control signals from a plurality of control devices. Also, the first communicator 110 may be used to receive and transmit data or a command for various purposes, e.g., for operating the smart TV 100, in addition to the control signals.

The first communicator 110 may be connected to a network through a wired or wireless router (i.e., an access point) for accessing wired or wireless Internet. The first communicator 110 may be connected to the external device, e.g., the mobile device 200 or a server through the connected wired or wireless network.

The first communicator 110 may employ data communication such as very high speed digital subscriber line (VDSL), Ethernet, token ring, HDMI, USB, a component, low voltage differential signaling (LVDS), HDMI Ethernet channel (HEC), etc.; mobile communication such as the 2nd generation mobile communication system (2G), the 3rd generation mobile communication system (3G), the 4th generation mobile communication system (4G), long term evolution (LTE), etc.; wireless Internet technology such as wireless local area network (WLAN, e.g., Wi-Fi), wireless broadband (Wibro), world interoperability for microwave access (Wimax), high speed downlink packet access (HSDPA), etc.; and short-range communication technology such as Bluetooth, radio frequency identification (RFID), infrared communication (e.g., infrared data association, IrDA), ultra wideband (UWB), ZigBee, near field communication (NFC), etc.

The first controller 120 may generally control internal elements of the smart TV 100. The first controller 120 may receive setting profile data of the smart TV 100 from the external device such as the mobile device 200, determine whether the initial setting of the smart TV 100 is previously performed, and sets up the smart TV 100 based on the received setting profile data when the initial setting is not performed. The first controller 120 may include an application for performing the initial setting, content control, and device control for the smart TV 100.

The first controller 120 may receive a power control signal of the smart TV 100 from the mobile device 200, and controls power of the smart TV 100 in accordance with the received power control signal.

The first controller 120 may turn on the smart TV in response to the power control signal from the mobile device 200, and activate a wireless communication module (not shown), for example, a Bluetooth or Wi-Fi module. Here, the first controller 120 may search the mobile device 200 to which the setting profile data is transmitted or which is remotely controlled after activating Bluetooth pairing or Wi-Fi direct communication. When a desired mobile device 200 is selected among the searched mobile devices, the setting profile data or the remote control signal may be received from the selected mobile device 200.

For example, when a user turns on and logs in to the smart TV 100 with a user account, the first controller 120 controls the first communicator 110 to request the mobile device 200 to transmit the setting profile data previously set up by the user and stored, parses the setting profile data received from the mobile device 200 according to the request, and performs the initial setting of the smart TV 100.

The setting information of the smart TV 100 may include, for example, at least one from among account creation, router setting, language setting, receiving-type setting, external input-type setting, network-type setting, service-provider setting, agreement to terms and conditions, data compression-type setting, communication-type setting, channel setting, application setting and remote controller setting.

The first controller 120 may execute an application for settings of the smart TV 100 when power is on, and receive the setting profile data from the mobile device 200, thereby applying the received data to the application for settings of the smart TV 100 such as account creation, router setting, language setting, receiving-type setting, external input-type setting, network-type setting, service-provider setting, agreement to terms and conditions, data compression-type setting, communication-type setting, channel setting, application setting, remote controller setting, etc. and storing the settings.

After performing and completing the initial setting of the smart TV 100, the first controller 120 may transmit information about setting completion, the kind of setting, update, etc. to the mobile device 200. That is, the first controller 120 controls the first communicator 110 in accordance with a user's command, extracts setting items of the smart TV 100, provides a backup of the setting items, and stores the setting items to the mobile device 200.

The first controller 120 receives information about an image displayed on the mobile device 200, and displays the image on the smart TV 100 based on the received information about the image.

Also, the first controller 120 may transmit information about an image displayed on the smart TV 100 to the mobile device 200 in accordance with a predetermined user's input.

The first controller 120 may include, for example, at least one from among application specific integrated circuits (ASICs), digital signal processors (DSPs), digital signal processing devices (DSPDs), programmable logic devices (PLDs), field programmable gate arrays (FPGAs), microcontrollers, and microprocessor.

The first storage 130 stores data without limitation. The first storage 130 is accessed by the first controller 120 such that the data may be read, recorded, modified, deleted, updated, etc. The data stored in the first storage 130 may, for example, include received contents, an operating system, various applications executable on the operating system, image data, additional data, etc. of the smart TV 100.

The first storage 130 may be provided as a nonvolatile memory (e.g., a writable read only memory (ROM)) such that data may not only be maintained even though the smart TV 100 is turned off but may also reflect a change to the data. For example, the first storage 130 may be provided as one of a flash memory, erasable programmable read only memory (EPROM), and electrically erasable programmable read only memory (EEPROM).

The first signal processor 140 may process video and audio signals to be displayed on the display 150.

The first signal processor 140 may perform various image processes without limitation, and the image process may, for example, include de-multiplexing for dividing a predetermined signal into signals according characteristics, decoding corresponding to an image format of image data, de-interlacing for converting interlace type image data into progressive type image data, scaling for adjusting the image data to have a preset resolution, noise reduction for improving image quality, detail enhancement, frame refresh rate conversion, etc.

The first signal processor 140 may be provided inside the smart TV 100 as a system-on-chip (SOC) where various functions are integrated, or an image processing board (not shown) and a sound processing board (not shown) where individual elements capable of performing processes independently of each other are placed on a printed circuit board.

The first display 150 displays an image based on an image signal output from the first signal processor 140. The first display 150 may be provided in various display types using, for example, liquid crystal, plasma, a light-emitting diode, an organic light-emitting diode, a surface-conduction electron-emitter, a carbon nano-tube, nano-crystal, etc., but not limited thereto.

The first display 150 may include an additional element in accordance with a type thereof. For example, when the first display 150 is a liquid crystal display, the first display 150 may further include a liquid crystal display (LCD) panel (not shown), a backlight unit (not shown) for emitting light to the LCD panel, and a panel driving substrate (not shown) for driving the panel.

The first display 150 may display a screen for login with a user account, which is generated by the first UI generator 180, when the power is on. The first UI generator 180 will be described in more detail later.

The first UI generator 180 may generate a user interface (UI) for an interface with a user. The generated UI may include a plurality of sub UIs provided in the form of icons, texts, etc. When a user selects a certain sub UI through the smart TV 100, an application program corresponding to the selected sub UI may be operated. That is, each sub UI may be generated as a unit of a plurality of functions of events capable of executing the application program in the smart TV 100.

The first UI generator 180 refers to a software or hardware function for generating and controlling a UI displayed on the smart TV 100, and thus functions thereof may be performed by the first controller 120. In other words, the UI generator 180 may be integrated with the first controller 120 instead of being provided by a separate chipset or a separate microprocessor.

Below, the mobile device 200 will be described as an external device connected to the smart TV 100 and which substantially performs the initial setting of the smart TV 100.

As shown in FIG. 3, the mobile device 200 according to an exemplary embodiment may include a second communicator 210, a second controller 220, a second storage 230, a second signal processor 240, a second display 250, an information recognizer 260, a user input section 270, and a second UI generator 280. In this exemplary embodiment, the mobile device 200 may be achieved by a smart phone, a tablet personal computer (PC), a notebook computer, etc.

The second communicator 210 may transmit and receive a wirelessly signal in accordance with preset wireless communication standards, or transmit and receive a signal to and from a corresponding external device through connection of various external input cables.

The second communicator 210 may include a plurality of connectors (not shown) to which cables are respectively connected. The second communicator 210 may receive, from the connected external input, a signal including, for example, a broadcasting signal, an image signal, a data signal, etc. based on high definition multimedia interface (HDMI), universal serial bus (USB) and component standards or communication data through a communication network.

The second communicator 210 may further include not only elements for receiving a signal and/or data from the external input, but also various additional elements such as a wireless communication module (not shown) for wireless communication and a tuner (not shown) for receiving the broadcasting signal in accordance with a design specification of the mobile device 200. The second communicator 210 may transmit information, data, or a signal to the smart TV 100 or a server (not shown). That is, the second communicator 210 may provide an interface for interactive communication. The second communicator 210 may receive control signals from a plurality of control devices. The second communicator 210 may be achieved by a communication module for well-known short-range wireless communication, such as Bluetooth, infrared (IR), ultra wideband (UWB), Zigbee, etc. The second communicator 210 may be used to receive and transmit data or a command for various purposes, e.g., for operating the smart TV 100.

The second controller 220 may generally control the internal elements of the mobile device 200. The second controller 220 may access the server (e.g., the App store), where the setting application of the smart TV 100 is located, based on information about an application for setting up the smart TV 100 received from the NFC tag 4 or the QR code 5 through the information recognizer 260. Also, the setting application may be downloaded, installed, and executed in accordance with a user's instruction.

The second controller 220 receives a user's input using the user input section 270 about the settings of the smart TV 100 through the executed application, and generates and stores the setting profile.

The setting information of the smart TV 100, previously set up through the application of the mobile device 200, may include, for example, at least one from among account creation, router setting, language setting, receiving-type setting, external input-type setting, network-type setting, service-provider setting, agreement to terms and conditions, data compression-type setting, communication-type setting, channel setting, application setting and remote controller setting.

The second controller 220 may transmit the setting profile data to the smart TV 100 when the smart TV 100 is turned on. Thus, the smart TV 100 may perform setting such as, for example, account creation, router setting, language setting, receiving-type setting, external input-type setting, network-type setting, service-provider setting, agreement to terms and conditions, data compression-type setting, communication-type setting, channel setting, application setting, remote controller setting, etc., based on the received setting profile data.

The second controller 220 may perform setting for data communication with the smart TV 100 through the second communicator 210, for example, setting for Bluetooth pairing or Wi-Fi direct.

The second controller 220 transmits the power control signal to the smart TV 100 when a power control command for the smart TV 100 is received from the NFC tag 4, and activates the wireless communication module (not shown), for example, a Bluetooth module or a Wi-Fi module. When the smart TV 100 completes the activation for Bluetooth pairing or Wi-Fi direct communication, the second controller 220 may detect the smart TV 100 to which the setting profile data is to be transmitted. When a desired smart TV 100 is selected among the detected devices, the second controller 220 may perform data communication with the selected smart TV 100.

The second controller 220 may transmit the setting profile data to the smart TV 100 through the second communicator 210 when the setting for the data communication is completed.

The second controller 220 may transmit a remote control command to the smart TV 100 in accordance with a user's command through, for example, a remote control menu of the application of the mobile device 200.

The remote control based on the application of the smart TV 100 may include control for contents currently displayed on the smart TV, setting or change a channel, power on/off, application (App) execution or control of an application of the smart TV 100, setting or change an environment of the smart TV, etc.

For example, the information recognizer 260 receives the power control command for the smart TV 100 from the NFC tag 4, and generates a power control signal corresponding to the received power control command, thereby transmitting the power control signal to the smart TV 100. When address information or an accessing command of an external server where the setting application is uploaded is received from the NFC tag 4 or the QR code 5, the second controller 220 may access the external server through the application of the mobile device 200.

The second controller 220 may transmit information about an image displayed on the mobile device 200 to the smart TV 100 in accordance with a user's input. Thus, the smart TV may display the same image as the image being displayed on the mobile device 200.

The second controller 220 may include, for example, at least one from among application specific integrated circuits (ASICs), digital signal processors (DSPs), digital signal processing devices (DSPDs), programmable logic devices (PLDs), field programmable gate arrays (FPGAs), microcontrollers, and microprocessor.

The second storage 230 stores data without limitation. The second storage 230 is accessed by the second controller 220 such that the data may be read, recorded, modified, deleted, updated, etc. The data stored in the second storage 230 may, for example, include the received setting profile data of the smart TV 100, contents, an operating system, various applications executable on the operating system, image data, additional data, etc.

The second storage 230 may be provided as a nonvolatile memory (e.g., a writable read only memory (ROM)) such that data may not only be maintained even though the mobile device 200 is turned off but may also reflect a change made to the data. For example, the second storage 230 may be provided as one of a flash memory, erasable programmable read only memory (EPROM) and electrically erasable programmable read only memory (EEPROM).

The second signal processor 240 may process video and audio signals to be displayed on the second display 250.

The second signal processor 240 may perform various image processes without limitation, and the image process may, for example, include de-multiplexing for dividing a predetermined signal into signals according characteristics, decoding corresponding to an image format of image data, de-interlacing for converting interlace type image data into progressive type image data, scaling for adjusting the image data to have a preset resolution, noise reduction for improving image quality, detail enhancement, frame refresh rate conversion, etc.

The second signal processor 240 may be provided inside the smart TV 100 as a system-on-chip (SOC) where various functions are integrated, or an image processing board (not shown) and a sound processing board (not shown) where individual elements capable of performing processes independently of each other are placed on a printed circuit board.

The second display 250 displays an image based on an image signal output from the second signal processor 240. The second display 250 may be provided in various display types using, for example, liquid crystal, plasma, a light-emitting diode, an organic light-emitting diode, a surface-conduction electron-emitter, a carbon nano-tube, nano-crystal, etc., but not limited thereto.

The second display 250 may include an additional element in accordance with a type thereof. For example, when the second display 250 is a liquid crystal display, the second display 250 may further include a liquid crystal display (LCD) panel (not shown), a backlight unit (not shown) for emitting light to the LCD panel, and a panel driving substrate (not shown) for driving the panel.

The second display 250 may display a screen for login with a user account, which is generated by the second UI generator 280, when the power is on. The second UI generator 280 will be described in more detail later.

The information recognizer 260 may receive or recognize information of the NFC tag 4 or the QR code 5 associated with the smart TV 100. The information of the NFC tag 4 may be received by an NFC module (not shown) and/or an application of the mobile device 200. Also, code recognition of the QR code 5 may be achieved by a camera module (not shown) and/or an application of the mobile device 200. The NFC tag 4 or the QR code 5 may include address information about the external server (e.g., the App store) from which an application for performing initial setting for the smart TV 100 may be downloaded. The application may include, for example, an application for the initial setting of the smart TV 100, an application for control of displayed contents, an application for control of the application, and an application for control of the device.

The information recognizer 260 may receive information through near field communication (NFC) or the camera module by contacting or positioning the mobile device 200 near the NFC tag 4 or the QR code 5 or by photographing the NFC tag 4 or the QR code 5.

The NFC may be achieved by a noncontact or contact type short-range wireless communication module. The NFC has improved security because of a short communication distance and is in the limelight as the next generation short-range communication technique since the NFC is relatively inexpensive. Further, the NFC does not need a dongle (i.e., a reader) used for a related art RFID because the NFC supports functions of reading and writing data. The NFC is similar to the existing short-range communication technique such as Bluetooth, etc., but requires no setting between devices, compared to Bluetooth.

The user input section 270 may include a keyboard, a mouse, a touch pad, a track ball, a key pad, a remote controller, a button, etc. through which a user may input data.

The second UI generator 280 may generate a UI for interface with a user. The generated UI may include a plurality of sub UIs provided in the form of an icon, a text, etc. When a user selects a certain sub UI through the mobile device 200, an application program corresponding to the selected sub UI may be operated. That is, each sub UI may be generated as a unit of a plurality of functions of events capable of executing the application program in the mobile device 200.

The second UI generator 280 refers to a software or hardware function for generating and controlling a UI displayed on the mobile device 200, and thus functions thereof may be performed by the second controller 220. In other words, the second UI generator 280 may be integrated with the second controller 220 instead of being provided by a separate chipset or a separate microprocessor.

Figure 4:
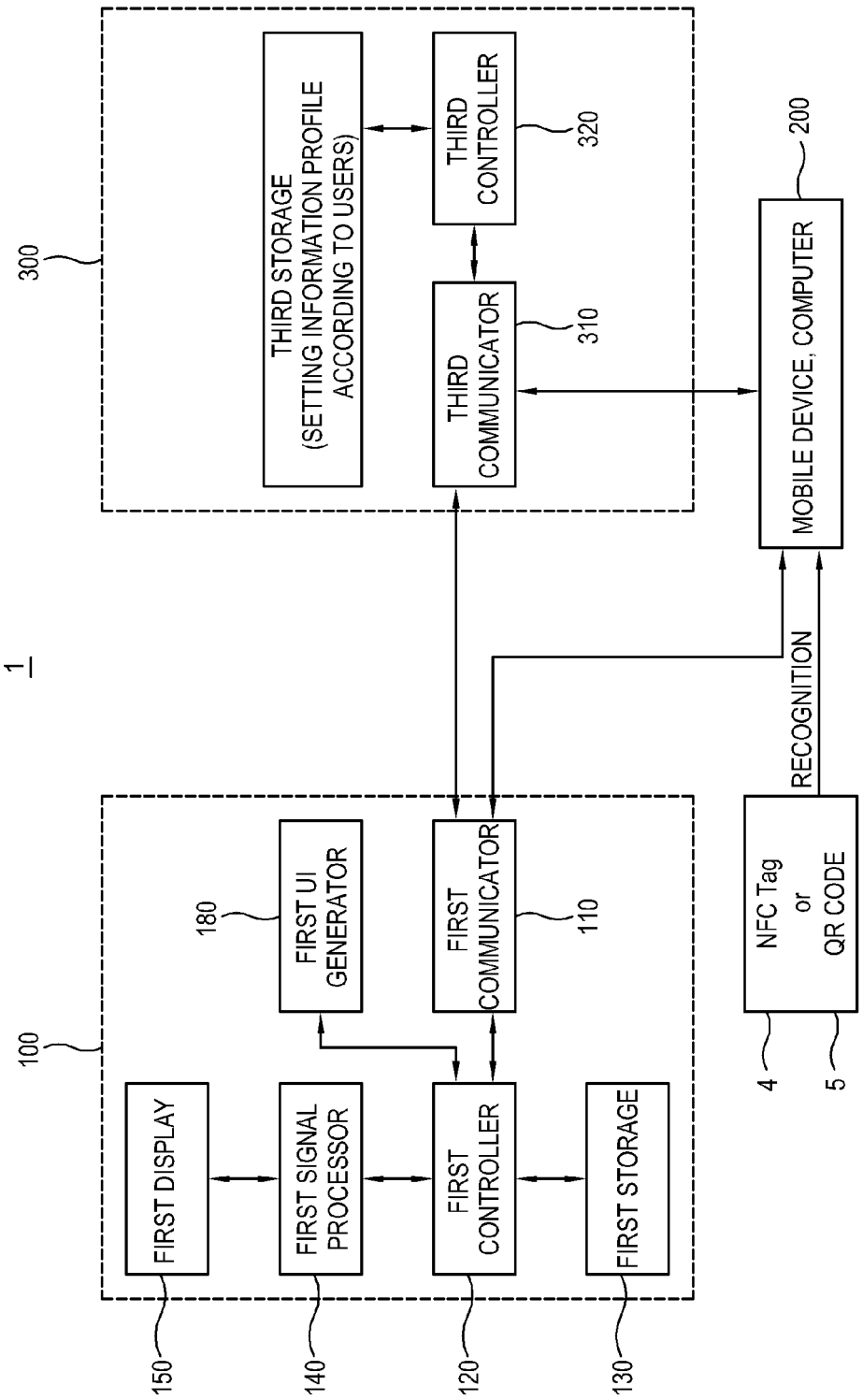
FIG. 4 is a block diagram showing an initial setting and remote control system according to another exemplary embodiment.

FIG. 4 is a block diagram showing an initial setting and remote control system 1 according to another exemplary embodiment, which includes the smart TV 100, the mobile device 200 as a setting item input device, and a server 300. According to an exemplary embodiment, the smart TV 100 performs the initial setting by receiving the setting profile data from the server 300, and is remotely controlled by the mobile device 200. The mobile device 200 may acquire location information of the server 300 having a setting webpage for the smart TV 100. Also, the mobile device 200 may acquire information about the App store where an application for remotely controlling the smart TV 100 is provided, from the NFC tag 4 or the QR code 5. That is, the server 300 may be used for the initial setting of the smart TV 100, and the mobile device 200 may be used for the remote control of the smart TV 100.

According to an exemplary embodiment, the initial setting and the remote control system 1 have configurations similar to those of the exemplary embodiment of FIG. 3. Below, repetitive descriptions will be avoided for convenience of description, and only different parts will be described.

The smart TV 100 may include a first communicator 110 for communicating with the server 300 and the mobile device 200 as the setting item input device, a first controller 120 for controlling elements of the smart TV 100, a first storage 130 for storing data and programs, a first signal processor 140 for processing an input thereof, a first display 150 for displaying the processed input.

The first communicator 110 may be connected to a network through a wired and/or wireless router (i.e., an access point), for accessing wired and/or wireless Internet. The first communicator 110 may access the server 300 through the connected network, and download a setting information profile uploaded to the server 300.

The first controller 120 may generally control respective elements of the smart TV 100. For example, when a user turns on and logs in to the smart TV 100 with a user account, the first controller 120 controls the first communicator 110 to request the server 300 to provide a setting profile data previously set up by the user and stored, parses the setting profile data received from the server 300 according to the request, and performs the initial setting of the smart TV 100.

Also, the first controller 120 may control the first communicator 110 to extract settings of the smart TV 100 and provide and store a backup to the server 300 in accordance with a user's command. The settings of the smart TV 100 may include, for example, account creation, router (AP) setting, language setting, receiving-type setting, external input-type setting, network-type setting, service-provider setting, agreement to terms and conditions, remote-controller (multi-brand remote, MBR) setting, information about the installed the application, or location information of the application, etc.

The first controller 120 turns on the smart TV 100 in response to the power control signal from the mobile device 200, and activates the wireless communication module (not shown), for example, a Bluetooth module or a Wi-Fi module. Here, the first controller 120 may detect the mobile device 200 by which the smart TV 100 is to be remotely controlled, after the activation for Bluetooth pairing or Wi-Fi direct communication is performed. When a desired mobile device 200 is selected among the detected devices, the first controller 120 may receive a remote control signal from the selected mobile device 200.

The first controller 120 may include, for example, at least one from among application specific integrated circuits (ASICs), digital signal processors (DSPs), digital signal processing devices (DSPDs), programmable logic devices (PLDs), field programmable gate arrays (FPGAs), microcontrollers, and microprocessor.

The first storage 130 stores data without limitation. The first storage 130 is accessed by the first controller 120 such that the data may be read, recorded, modified, deleted, updated, etc. The data stored in the first storage 130 may, for example, include the received setting profile data, contents, an operating system, various applications executable on the operating system, image data, additional data, etc. of the smart TV 100.

The first display 150 may display a screen for login with a user account, which is generated by a first UI generator 180, under control of the first controller 120 when the power is on.

The wired and/or wireless router (not shown) is an Internet protocol (IP) address sharer, which assigns IP addresses inherent to the connected devices to virtual IP addresses such that the smart TV may access the wired and/or wireless Internet.

The server 300 may include a third communicator 310 which transmits and receives data to and from the smart TV 100 and the mobile device 200, a third controller 320 which generates setting profile data based on setting item data of the smart TV 100 input by a user and received through the third communicator 310, and a third storage 330 which stores the setting profile data of the smart TV 100 according to users.

The third communicator 310 may connect to a wired and/or wireless network through the wired and/or wireless router (i.e., an access point) for accessing the Internet. The third communicator 310 may receive at least one setting item from the mobile device 200 through the Internet, or transmit the setting profile data to the smart TV 100 targeted for the setting through the connected network.

The third communicator 310 may employ data communication such as very high speed digital subscriber line (VDSL), Ethernet, token ring, HDMI, USB, a component, LVDS, HEC, etc.; mobile communication such as the 2nd generation mobile communication system (2G), the 3rd generation mobile communication system (3G), the 4th generation mobile communication system (4G), long term evolution (LTE), etc.; and wireless Internet technology such as wireless local area network (WLAN, e.g., Wi-Fi), wireless broadband (Wibro), world interoperability for microwave access (Wimax), high speed downlink packet access (HSDPA), etc.

The third controller 320 may generally control internal elements of the server 300. The third controller 320 may control the third communicator 310 to transmit a webpage for inputting a setting item requested by a user through an external device such as, for example, the mobile device 200 or a computer. Also, the third controller 320 may generate the setting profile data based on data about the setting item received through the third communicator 310. Also, the third controller 320 may control the third communicator 310 to transmit the setting profile data stored in the third storage 330, which is requested by the smart TV 100 targeted for the setting.

The third controller 320 may include, for example, at least one from among application specific integrated circuits (ASICs), digital signal processors (DSPs), digital signal processing devices (DSPDs), programmable logic devices (PLDs), field programmable gate arrays (FPGAs), microcontrollers, and microprocessor.

The third storage 330 stores data without limitation. The data stored in the third storage 330 may, for example, include setting item profiles of a certain display apparatus, e.g., the smart TV 100, according to users, an operating system, various applications executable on the operating system, etc. The third storage 330 may store the setting profile data according to a plurality of smart TVs when the plurality of smart TVs are used. The third storage 330 is accessed by the third controller 320 such that the data may be read, recorded, modified, deleted, updated, etc.

The mobile device 200 is a device for allowing a user to access the server 300 and receive the webpage such that various setting items of the smart TV 100 may be set up. It should be noted that this is only an example and a computer such as a notebook computer or a personal computer may be used instead of the mobile device 200. The mobile device 200 according to the exemplary embodiment in FIG. 4 may have the same or similar configuration as that shown in FIG. 3 and thus will be described with reference to the block diagram of FIG. 3.

As shown in FIG. 3, the mobile device 200 may include the second communicator 210 capable of communicating with an external device such as the server 300, the second controller 220 for controlling respective elements of the mobile device 200, the second storage 230, the second signal processor 240 for processing an input signal, the second display 250 for displaying the processed input signal, the information recognizer 260, the user input section 270 for receiving a user's input, and the second UI generator 280.

The second communicator 210 is connected to a network through the wired and/or wireless Internet access, and thus connected to the smart TV 100 and the server 300. The second communicator 210 may be connected the webpage in which the setting item of the smart TV may be input to the server 300 through the wired and/or wireless communication. Also, the second communicator 210 may send the server 300 the setting item data input by a user in the webpage through the wired and/or wireless communication.

The second controller 220 may generally control internal elements of the mobile device 200. For example, when information is recognized or received from the NFC tag 4 or the QR code 5 through the information recognizer 260, the second controller 220 analyzes the corresponding information and thus determines information about the smart TV 100 and information about the server 300 where the webpage or an application for setting up the smart TV 100 is located.

The second controller 220 also controls the second communicator 210 to receive the webpage for inputting the setting items of the smart TV 100 from the server 300, and send the server 300 the setting items of the smart TV 100 input to the webpage through the user input section 270.

The second storage 230 stores data without limitation. The second storage 230 is accessed by the second controller 220 such that the data may be read, recorded, modified, deleted, updated, etc. The data stored in the second storage 230 may, for example, include the received setting profile data of the smart TV 100, contents, an operating system, various applications (e.g., a remote control application for the smart TV 100) executable on the operating system, image data, additional data, etc.

The second signal processor 240 may process video and audio signals to be displayed on the second display 250.

The information recognizer 260 may receive or recognize information of the NFC tag 4 or the QR code 5 associated with the smart TV 100. The information of the NFC tag 4 may be received by an NFC module (not shown) and/or an application of the mobile device 200. Also, code recognition of the QR code 5 may be achieved by a camera module (not shown) and/or an application of the mobile device 200.

The NFC tag 4 or the QR code 5 may include address information about the server 300 or the App store from which a webpage or an application capable of performing virtual initial setting for the smart TV 100 may be downloaded. The application may include, for example, an application for the initial setting of the smart TV 100, an application for control of displayed contents, an application for control of the application, and an application for control of the device.

The information recognizer 260 may receive information through near field communication (NFC) or the camera module by contacting or positioning the mobile device 200 near the NFC tag 4 or the QR code 5 or by photographing the NFC tag 4 or the QR code 5.

The NFC may be achieved by a noncontact or contact type short-range wireless communication module. The NFC has improved security because of a short communication distance and is in the limelight as the next generation short-range communication technique since the NFC is relatively inexpensive. Further, the NFC does not need a dongle (i.e., a reader) used for the related art RFID because the NFC supports functions of reading and writing data. The NFC is similar to the existing short-range communication technique such as Bluetooth, etc., but requires no setting between devices, compared to Bluetooth.

The user input section 270 may include a keyboard, a mouse, a touch pad, a key pad, a remote controller, etc. through which a user may input data.

The second UI generator 280 may generate a UI for interface with a user. The generated UI may include a plurality of sub UIs provided in the form of an icon, a text, etc. When a user selects a certain sub UI through the mobile device 200, an application program corresponding to the selected sub UI may be operated. That is, each sub UI may be generated as a unit of a plurality of functions of events capable of executing the application program in the mobile device 200.

Figure 5:
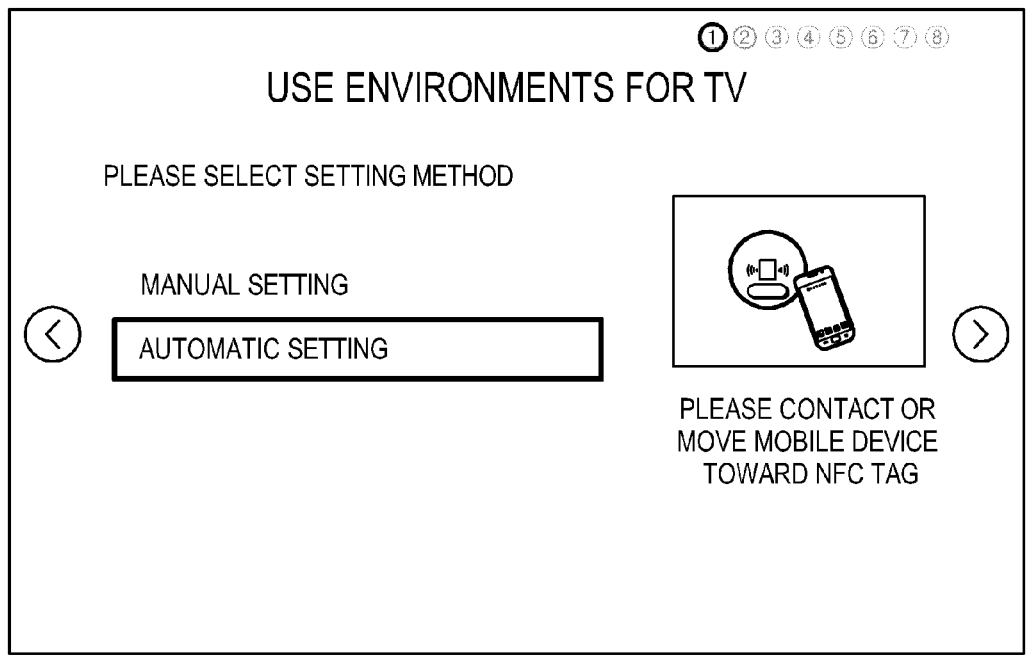

FIG. 5 shows an initial screen when a smart TV is purchased and first turned on. It should be noted that this embodiment is only an example and initial setting of the smart TV may be guided to be performed through an external setting guide such as, for example, using the NFC tag 4 or the QR code 5 and the mobile device 200 instead of the initial screen.

Figure 6:
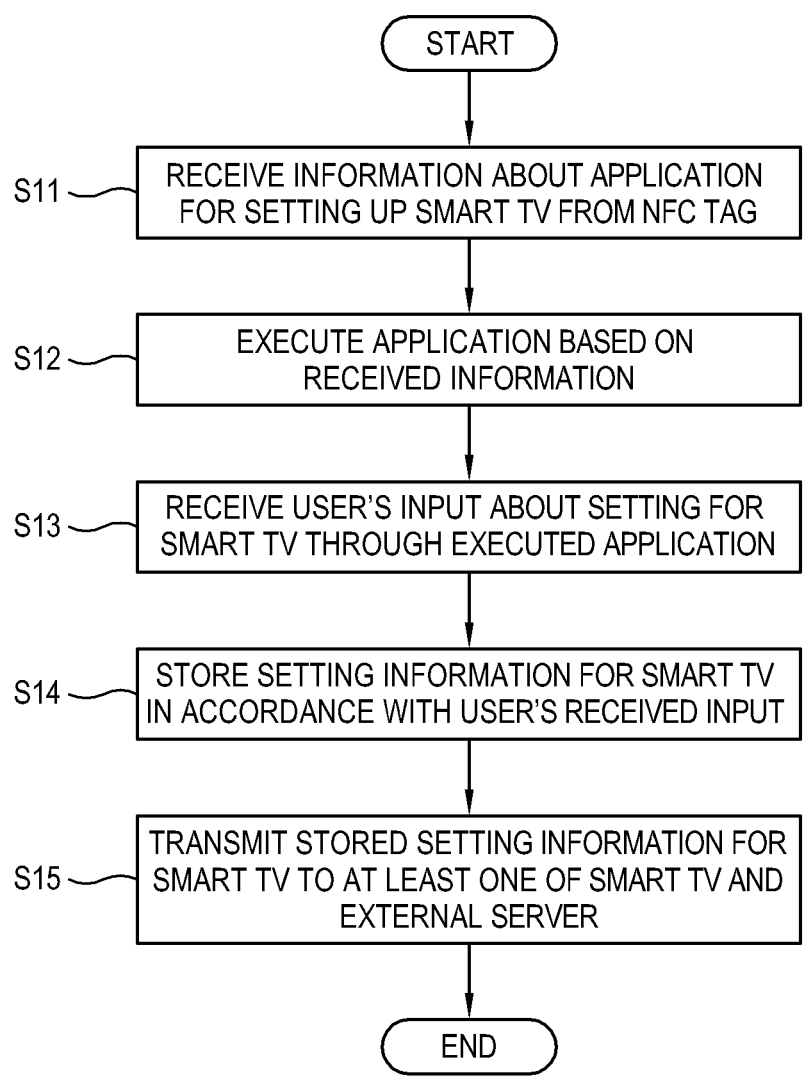
FIG. 6 is a flowchart showing a process of setting up a smart TV through a mobile device according to an exemplary embodiment.

FIG. 6 is a flowchart showing a process of setting up a smart TV through a mobile device according to an exemplary embodiment.

The mobile device 200 is used to receive information about the application for setting up the smart TV 100 from the NFC tag 4 or the QR code 5 (S11).

The application is executed based on the received information (S12).

A user's input for setting up the smart TV 100 is received through the executed application (S13). FIGS. 7 to 12 show examples of the initial setting of the smart TV 100 by using the setting application.

Figure 7:
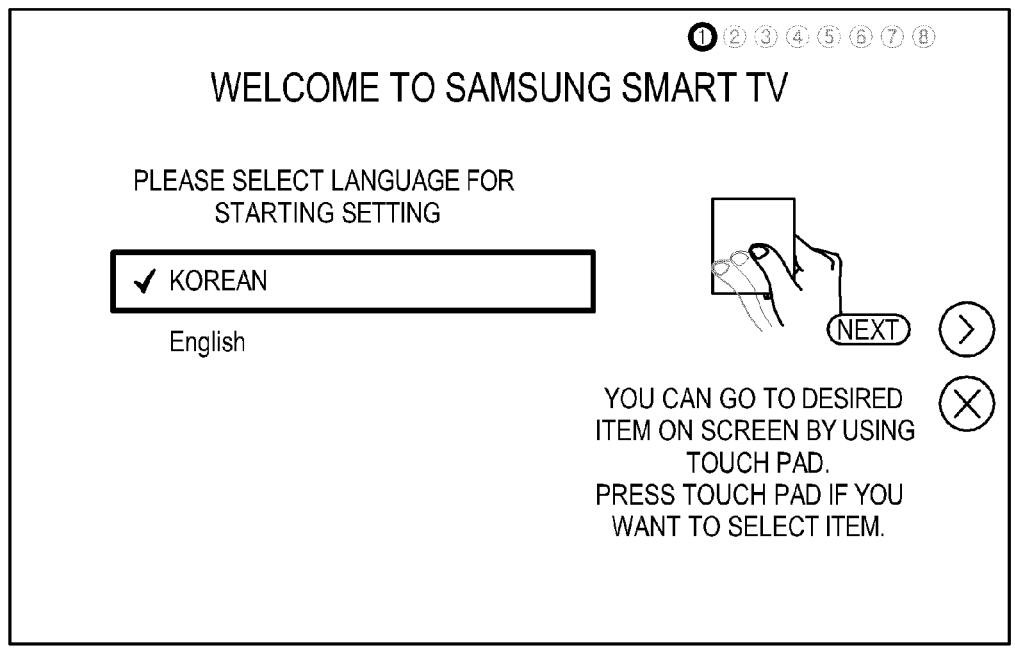
FIGS. 7 to 12 show examples where initial setting of a smart TV is performed through a mobile device according to exemplary embodiments.
Figure 8:
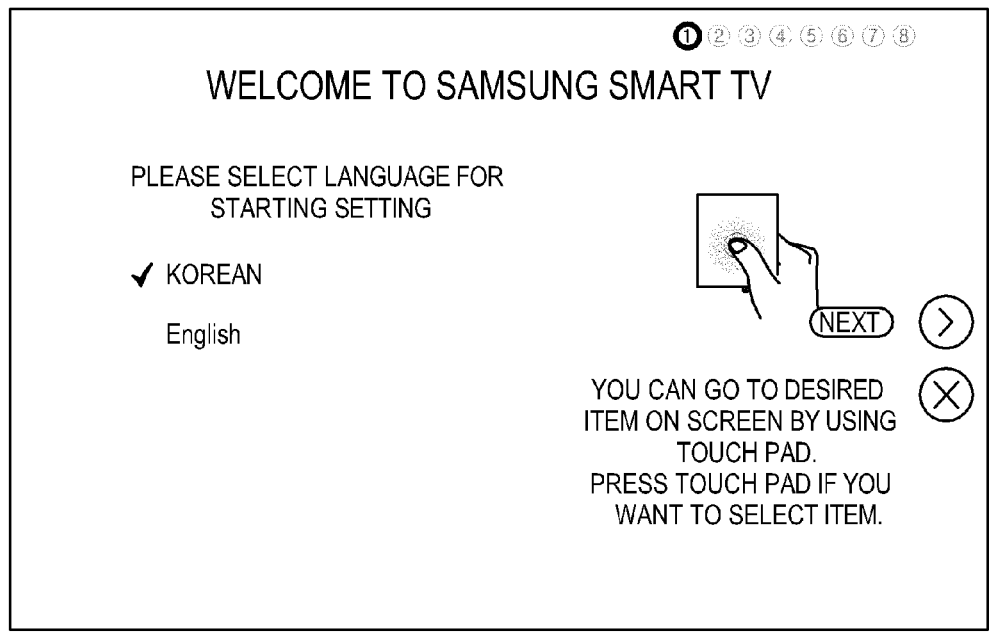

FIG. 7 shows that a user performs language setting through the mobile device 200. For example, the user may perform language setting through the application or the webpage for setting the smart TV 100 by using the mobile device 200. A user may select a desired language item through a touch pad. When the user chooses Korean, the language is set into Korean as shown in FIG. 8.

Figure 9:
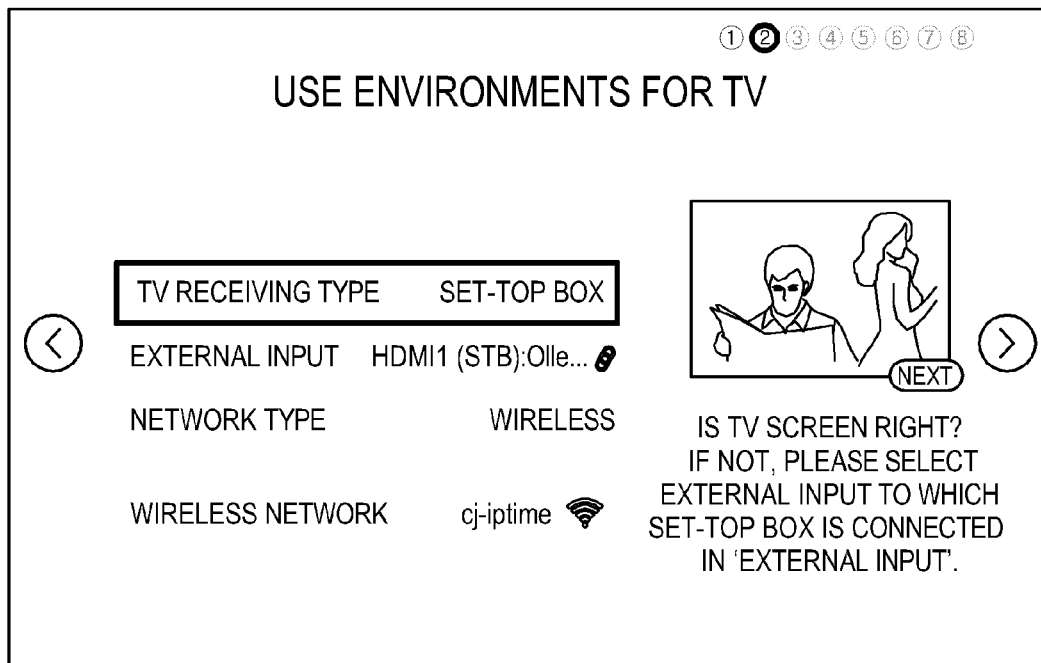
Figure 10:
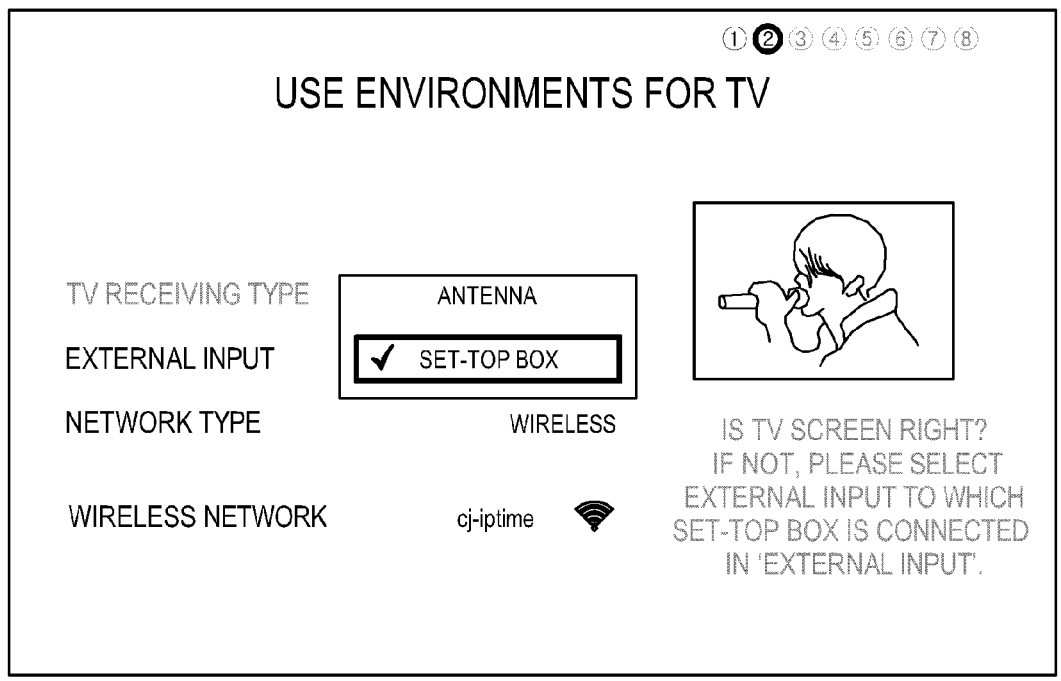

FIG. 9 shows TV receiving-type setting to select a TV receiving type through the application or the webpage using the mobile device 200. When a user chooses a set-top box as the TV receiving type, the smart TV 100 may be set up as shown in FIG. 10.

Figure 11:
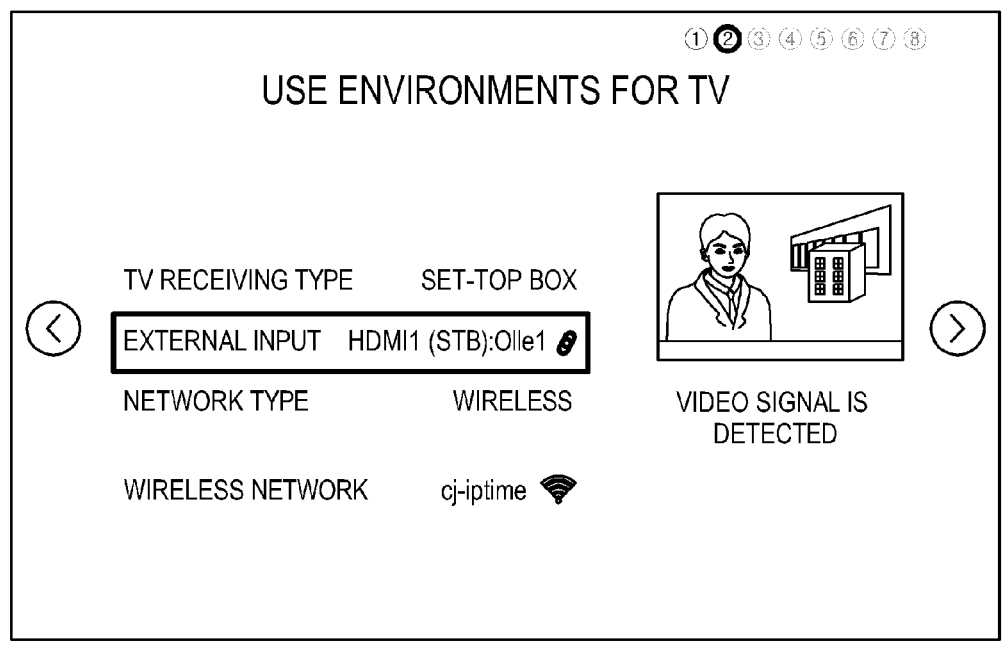
Figure 12:
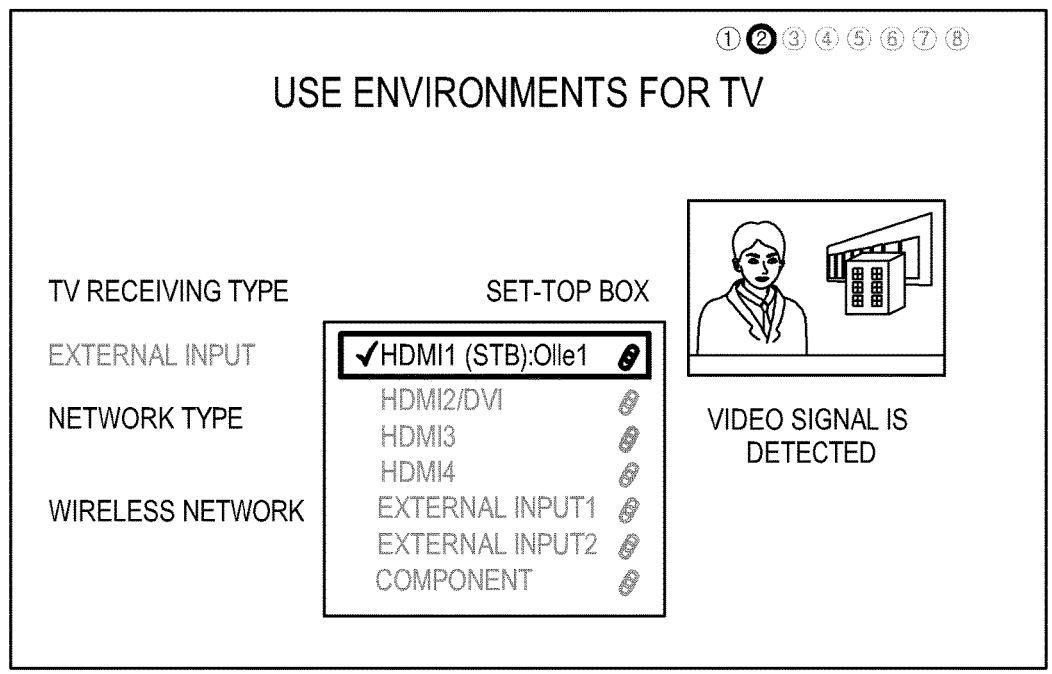

FIG. 11 shows external input setting through the application or the webpage using the mobile device 200. When a user selects an HDMI1 (STB), the external input-type is set up as the HDMI1 (STB) as shown in FIG. 12.

FIGS. 7 to 12 are given as examples of performing the setting of the smart TV 100. Here, the setting may include, for example, a wired or wireless network-type setting, router setting of a wireless network, terms and conditions for using a smart hub, collection of personal information, use agreement, service provider selection, and various initial settings.

Referring back to FIG. 6, the setting information of the smart TV 100 is stored in accordance with the received user's input (S14).

The stored setting information of the smart TV 100 is transmitted to at least one of the smart TV 100 and the server 300 (S15).

Figure 13:
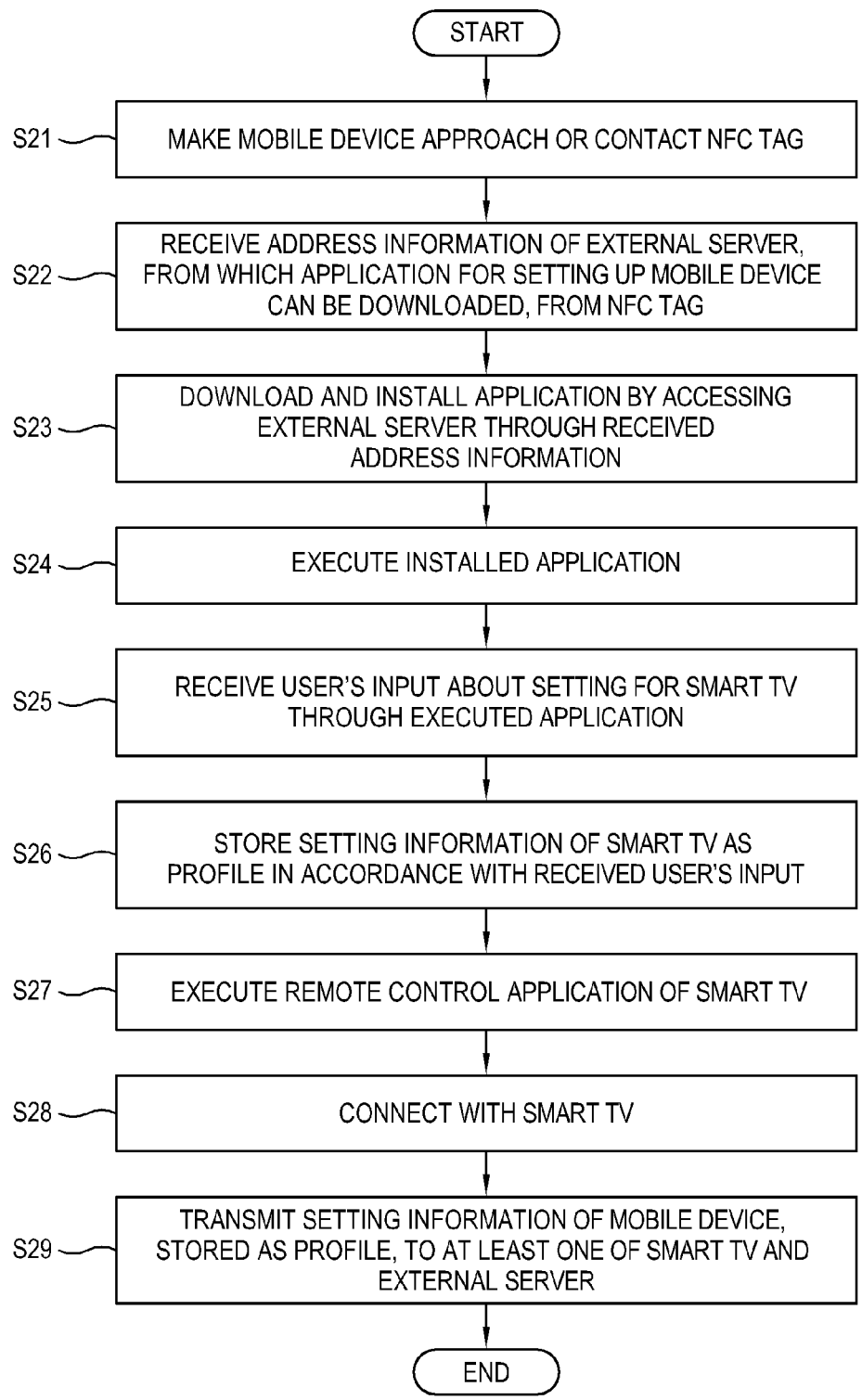
FIG. 13 is a flowchart showing a process of performing initial setting of a smart TV according to another exemplary embodiment.

FIG. 13 is a flowchart showing a process of performing initial setting of a smart TV according to another exemplary embodiment.

The mobile device 200 receives information of the NFC tag 4 or the QR code 5 (S21). For example, the mobile device 200 may approach, contact or photograph the NFC tag 4 or the QR code 5 to receive information thereof.

Information about the address of the external server (e.g., the App store), which stores the application for setting up the smart TV 100 and the application for remotely controlling the smart TV 100, is received from the NFC tag 4 or the QR code 5 (S22).

The applications are downloaded and installed by accessing the received address of the external server (e.g., the App store) (S23).

The installed application for setting up the smart TV 100 is executed (S24).

Through the executed application, a user's input about the setting up the smart TV 100 is received. For example, the user's input may include inputs for setting up the smart TV 100 as shown in the examples of FIGS. 7 to 12 (S25).

Setting information of the smart TV 100 is stored as a profile in accordance with the received user's input (S26).

The application for remotely controlling the smart TV 100 is executed (S27). In this case, the smart TV 100 may be automatically turned on. Alternatively, the smart TV 100 may be turned on through the application for remotely controlling the smart TV 100.

For communication, the mobile device 200 connects with the smart TV 100 (S28). For example, Bluetooth pairing or Wi-Fi direct between the mobile device 200 and the smart TV 100 may be performed.

The setting information of the smart TV 100, stored as the profile, is transmitted to at least one of the smart TV 100 and the server 300 (S29).

Figure 14:
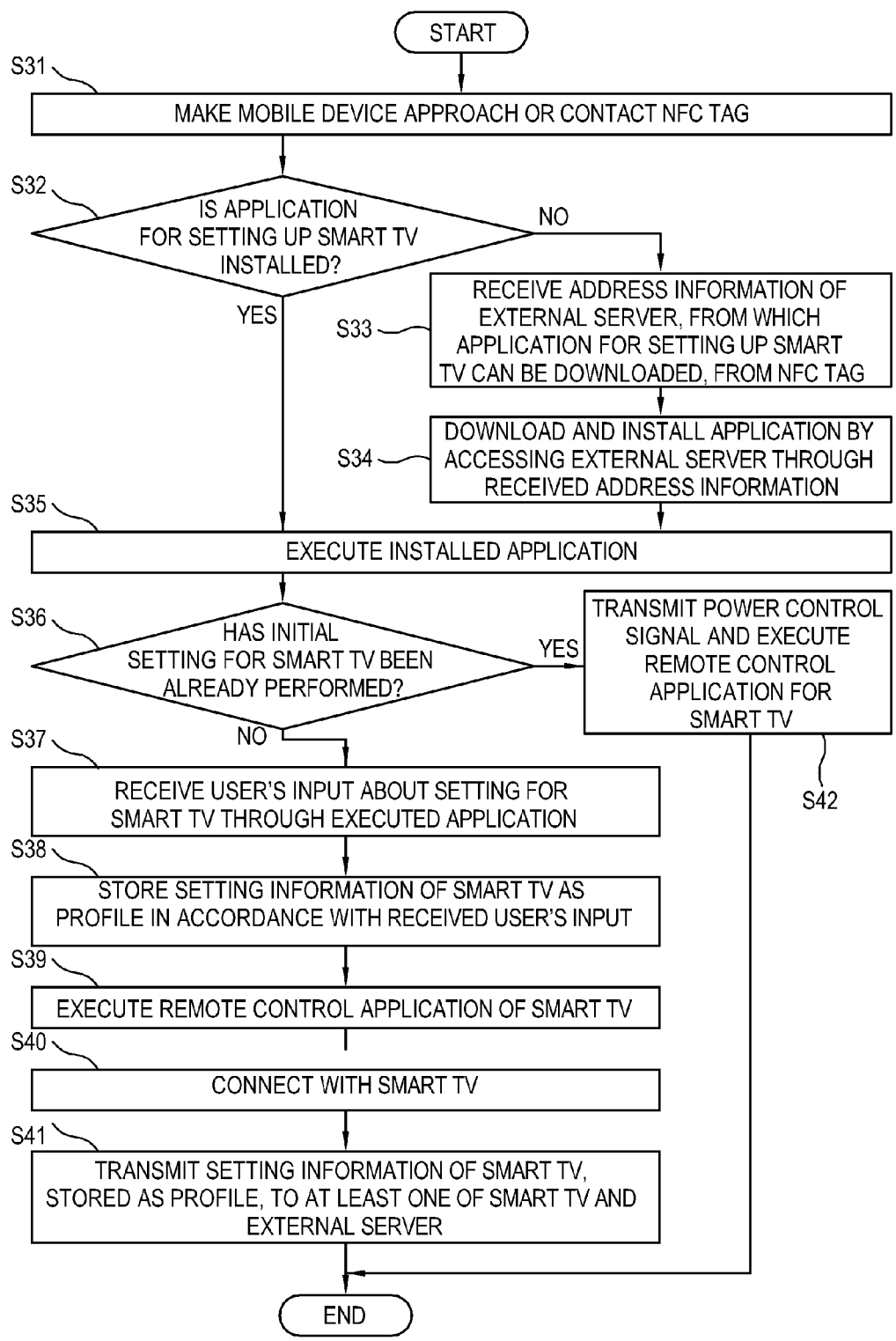
FIG. 14 is a flowchart showing a process of performing initial setting of a smart TV according to still another exemplary embodiment.

FIG. 14 is a flowchart showing a process of performing initial setting of a smart TV according to still another exemplary embodiment.

The mobile device 200 receives information of the NFC tag 4 or the QR code 5 (S31). For example, the mobile device 200 may approach, contact, or photograph the NFC tag 4 or the QR code 5.

It is determined whether the application for setting up the smart TV 100 is installed (S32).

When the application for setting up the smart TV 100 is not installed, the information about the address of the external device (e.g., the App store), from which the application for setting up the smart TV and the application for remotely controlling the smart TV 100 may be downloaded, is received from the NFC tag 4 or the QR code 5 (S33).

The applications are downloaded and installed by accessing the received address of the external server (e.g., the App store) (S34).

The installed application for setting up the smart TV 100 is executed (S35). Here, when the application for setting up the smart TV 100 has already been installed in the operation S32, the application for setting up the smart TV 100 is executed (S35).

It is determined whether the initial setting for the smart TV 100 has been performed (S36).

When the initial setting for the smart TV 100 has been performed, the power control signal is transmitted to the smart TV 100 to control the smart TV 100 to turn on, and the application for remotely controlling the smart TV 100 is performed to control the smart TV 100 (S42).

When the initial setting for the smart TV 100 has not been performed, a user's input about the setting of the smart TV 100 is received through the executed application. For example, the user's input may include inputs for setting up the smart TV 100 as shown in the examples of FIGS. 7 to 12 (S37).

The setting profile of the smart TV 100 is generated and stored in accordance with the received user's input (S38).

The application for remotely controlling the smart TV 100 is executed (S39). In this case, the smart TV 100 may be automatically turned on when the application is executed. Alternatively, the application for remotely controlling the smart TV 100 may be used to turn on the smart TV 100.

For communication, the mobile device 200 connects with the smart TV 100 (S40). For example, Bluetooth pairing or Wi-Fi direct connection may be performed between the mobile device 200 and the smart TV 100.

The setting information of the smart TV 100, stored as the profile, is transmitted to at least one of the smart TV 100 and the server 300 (S41).

Figure 15:
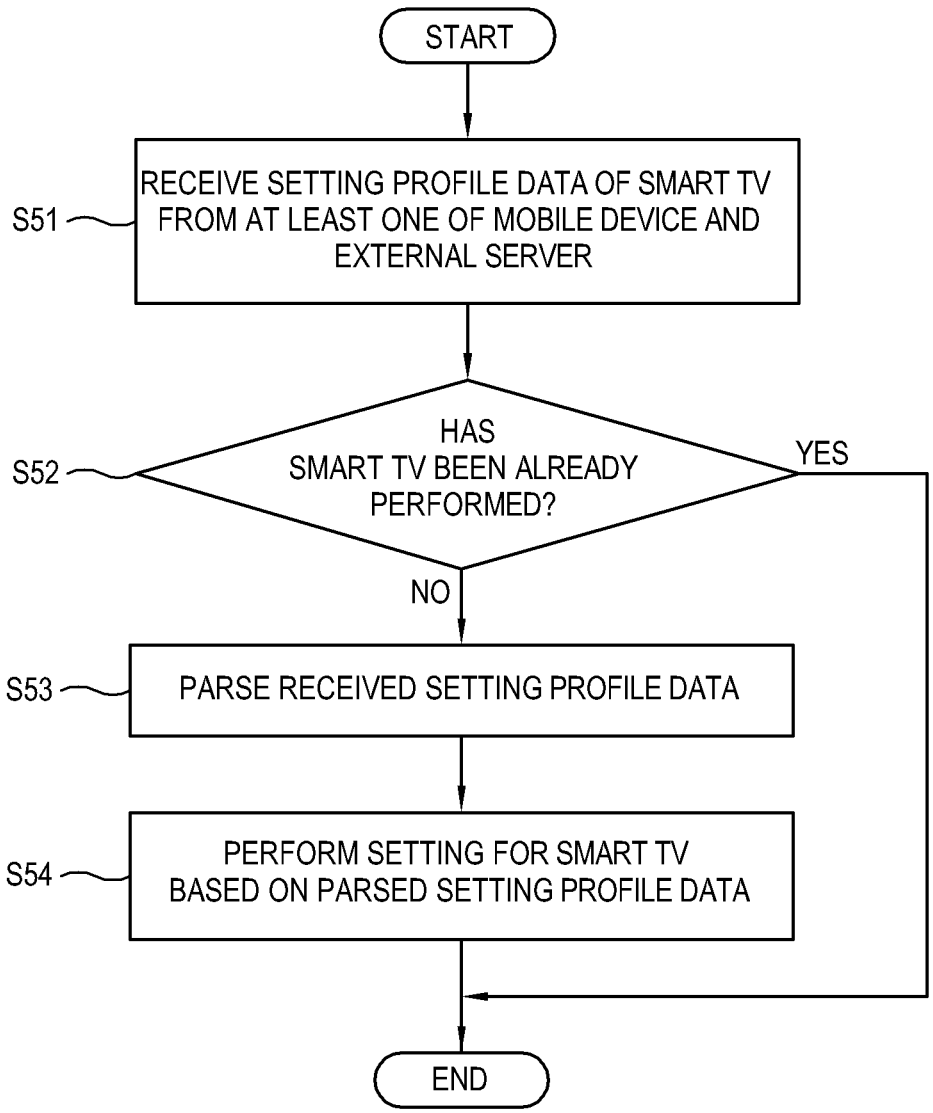
FIG. 15 is a flowchart showing an initial setting operation of a smart TV according to an exemplary embodiment.

FIG. 15 is a flowchart showing an initial setting operation of a smart TV according to an exemplary embodiment;

The setting profile data is received from at least one of the mobile device 200 and the server 300 (S51).

It is determined whether the initial setting for the smart TV 100 has been performed (S52).

When the initial setting has already been performed, the initial setting operation is terminated.

On the other hand, when the initial setting has not already been performed, the received setting profile data is parsed (S53).

The initial setting of the smart TV 100 is performed based on the parsed setting profile data (S54).

Figure 16:
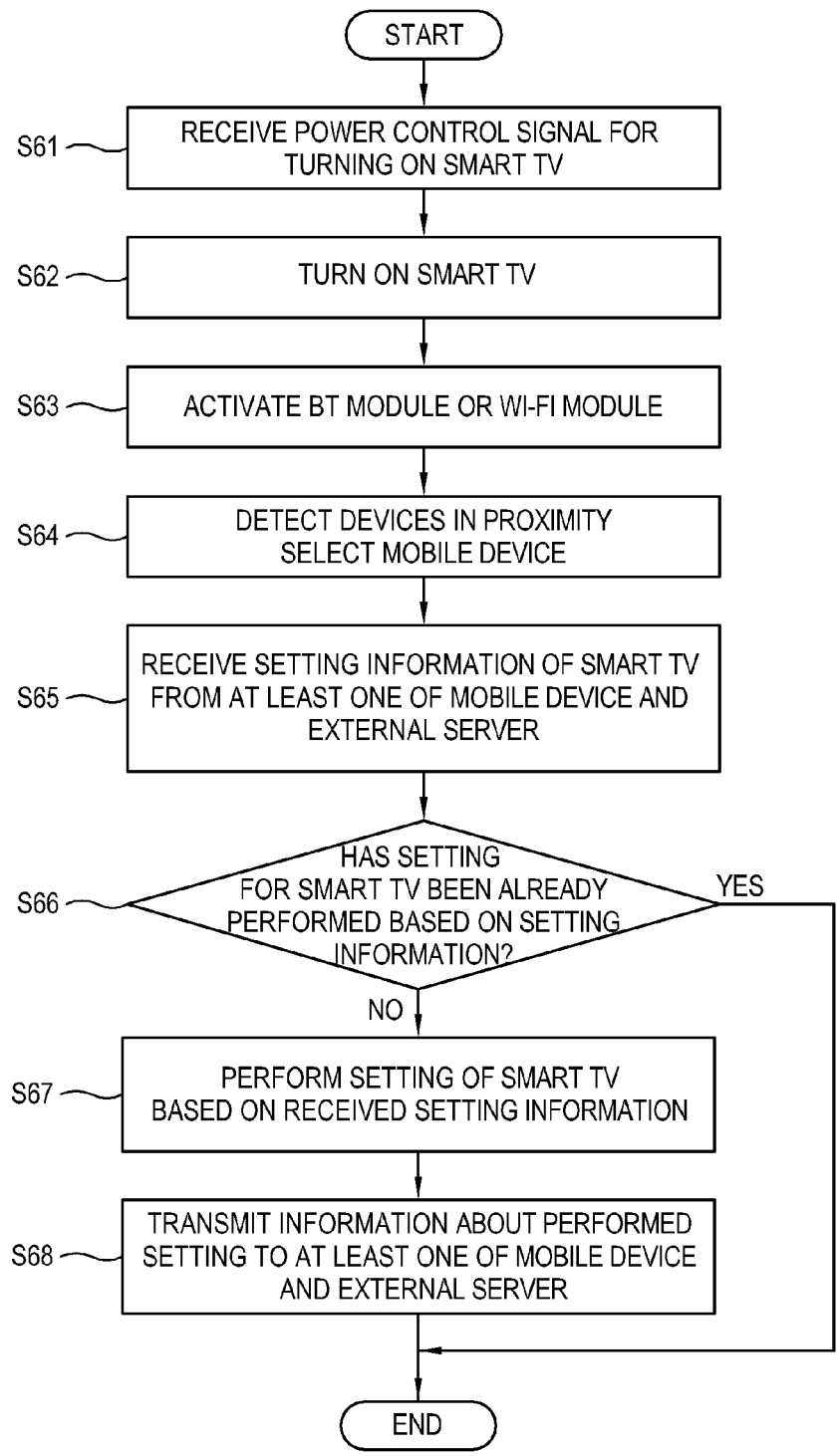
FIG. 16 is a flowchart showing an initial setting operation of a smart TV according to another exemplary embodiment.

FIG. 16 is a flowchart showing an initial setting operation of a smart TV according to another exemplary embodiment.

The power control signal for turning on the smart TV 100 is received (S61). Here, the power control signal may be automatically generated by an application execution command of a remote controller of the mobile device 200 stored in the NFC tag 4 when the mobile device 200 approaches or contacts the NFC tag 4.

The smart TV 100 is turned on in accordance with the power control signal (S62).

Next, the smart TV 100 activates the wireless communication module to perform wireless communication with the mobile device and detect devices located in proximity to the smart TV 100 (S63). For example, the wireless communication module may include the Bluetooth module or Wi-Fi module which performs Bluetooth pairing or Wi-Fi direct with the mobile device 200.

Next, the mobile device 200 for transmitting the setting profile or performing remote control of the smart TV 100 is selected among the detected devices (S64).

The setting profile data is received from at least one of the mobile device 200 and the external server 300 (S65).

It is determined whether the initial setting for the smart TV has been performed (S66).

When the initial setting has already been performed, the initial setting operation is terminated.

On the other hand, when the initial setting has not already been performed, the setting of the smart TV 100 is performed based on the received setting profile data (S67).

When the setting is completed, information about the performed setting is transmitted to at least one of the mobile device 200 and the external server 300 (S68). Here, the smart TV 100 may store information (e.g., setting profile data) of the setting.

According to an exemplary embodiment, the process of performing the initial setting of the smart TV 100 is as follows.

A user may control the mobile device 200 to approach and/or contact the NFC tag 4 while going to work and receive the address information of the external server 3 for setting up the smart TV 100. Based on the received address information, the mobile device 200 may automatically access the external server (e.g., the App server). The application for setting and remotely controlling the smart TV 100 in the external server (e.g., the App server) is downloaded, and manually or automatically installed. The application for setting up the smart TV 100 is executed to perform the initial setting of the smart TV 100. Here, the mobile device 200 generates and stores the setting profile data when the smart TV 100 is set up. After storing the setting profile data, a user interface (UI) for allowing a user's selection to be transmitted to the smart TV 100 is displayed. When the mobile device 200 is placed remotely from the smart TV 100, a UI may be displayed for informing such location information and selecting transmission to a separate server 300. In response to a user's selection, the setting profile data is transmitted to at least one of the smart TV 100 and the server 300. When the mobile device 200 is placed at a predetermined distance or more away from the smart TV 100, the setting profile data may be transmitted to the server 300. The transmitted setting profile data includes address information about a home network to which the smart TV 100 belongs, such that the server 300 may transmit the setting profile data to the smart TV 100. Also, the setting profile data may be encoded and transmitted in response to a request from the smart TV 100. Thus, the smart TV 100 may receive and decode the setting profile data, and perform the initial setting. The smart TV 100 may transmit information about completion of setting to at least one of the mobile device 200 and the server 300 when the setting is completed. Here, for example, although the information about the setting completion transmitted by the smart TV 100 is not received in the mobile device 200, the server 300 may transmit the information about the setting completion of the smart TV 100 to the mobile device 200. The user controls the mobile device 200 to approach or contact the NFC tag 4 while getting off work. The mobile device 200 receives the power control command and transmits the power control signal to the smart TV 100 to turn on the smart TV 100. When the initial setting of the smart TV 100 has not been already performed, the smart TV 100 may automatically perform the initial setting in accordance with the setting profile data.

Also, the mobile device 200 and the smart TV 100 may be configured to have setting environment shared therebetween, for example, a use language, a use location, a communication type, etc. In this case, the setting environment of the mobile device may be directly transmitted and applied to the smart TV 100.

FIGS. 17 to 22C show examples of controlling a smart TV through a mobile device according to exemplary embodiments;

FIG. 17 shows a state that the smart TV 100 is controllable through the application of the mobile device 200 when the initial setting of the smart TV 100 is skipped and replaced by the setting profile provided by the mobile device 200 when the smart TV 100 is turned on. In an exemplary embodiment, the setting profile may be generated when the mobile device 200 performs the setting for the smart TV 100. Here, a part of an application of the mobile device 200 may display the same image displayed on the smart TV 100. Also, an application compatible with or the same as an application installed in the mobile device 200 may be installed in the smart TV 100. The smart TV 100 may be controlled through the application installed therein or through the application installed in the mobile device 200.

Figure 18:
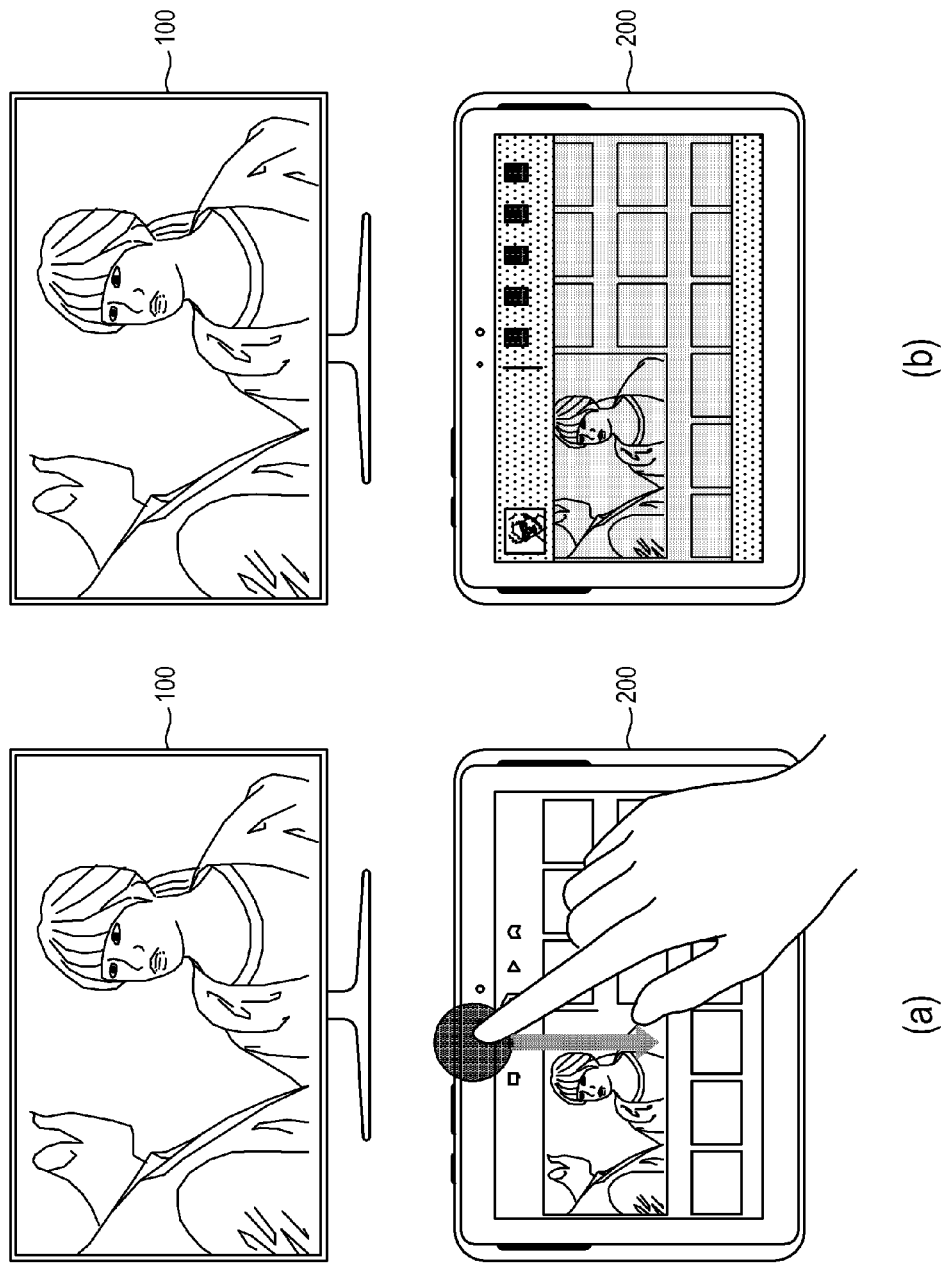

When a user drags in an up, down, left, or right direction, e.g., in a down direction on a screen of the mobile device 200 as shown in (a) in FIG. 18, a menu screen for remote controlling the smart TV 100 may be displayed on the mobile device 200 as shown in (b) in FIG. 18. The menu screen on the mobile device 200 may include an application menu for remote control including, for example, a display, a speaker, Internet, etc. of the smart TV 100. The menu screen may be displayed together with a broadcasting image currently broadcasted. Also, the menu screen may be displayed in response to a user's preset input, and there is no limit to a shape of the menu screen.

Figure 19:
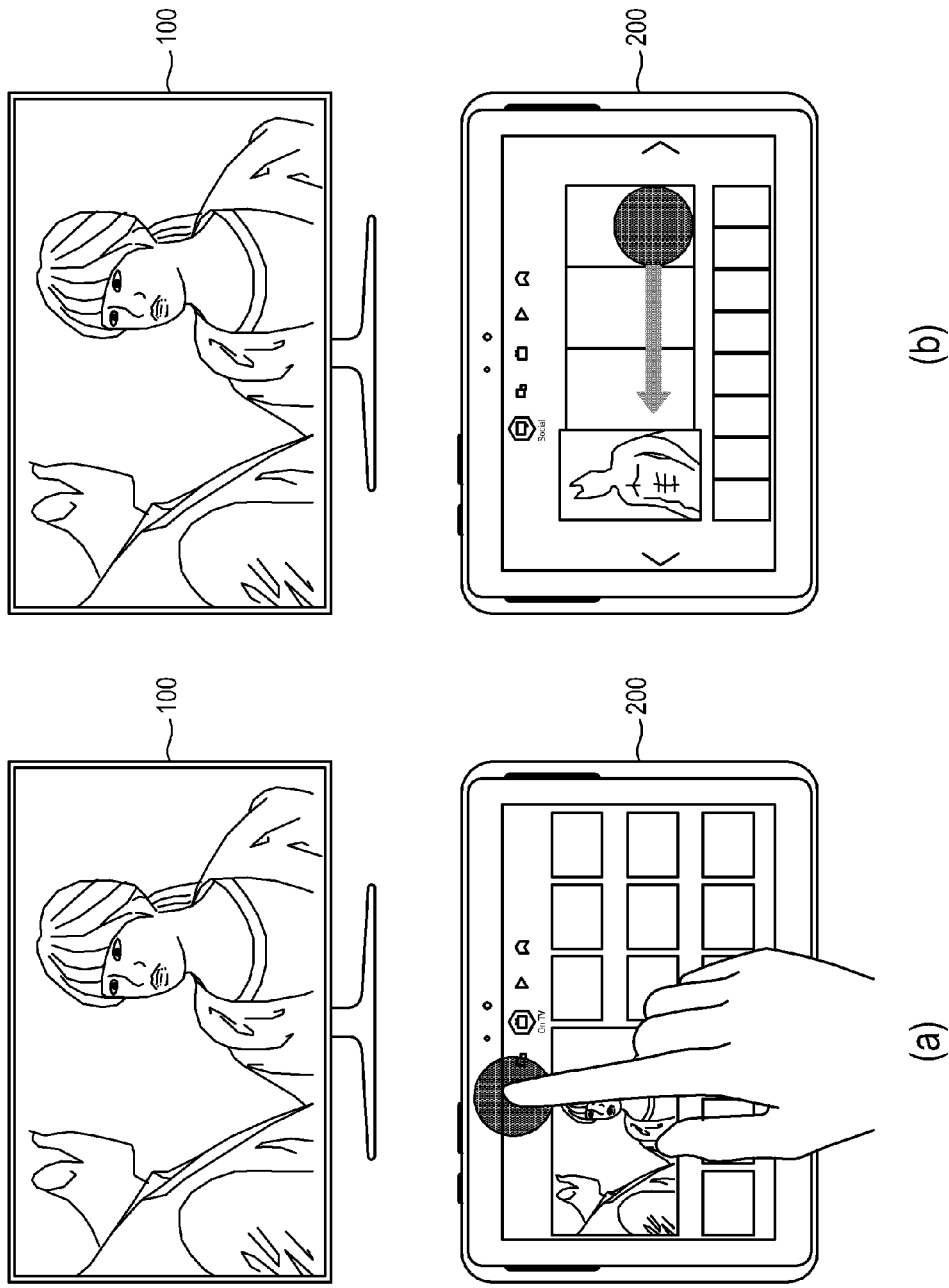

As shown in (a) in FIG. 19, when a certain button of the mobile device 200 is touched, icons of the application may move in an up, down, left, or right direction, e.g., in a left direction as shown in (b) in FIG. 19. The movement of the icons may be performed in response to, for example, a touch and drag or selecting an arrow button provided in a predetermined region on the mobile device 200, depending on menu settings.

Figure 20:
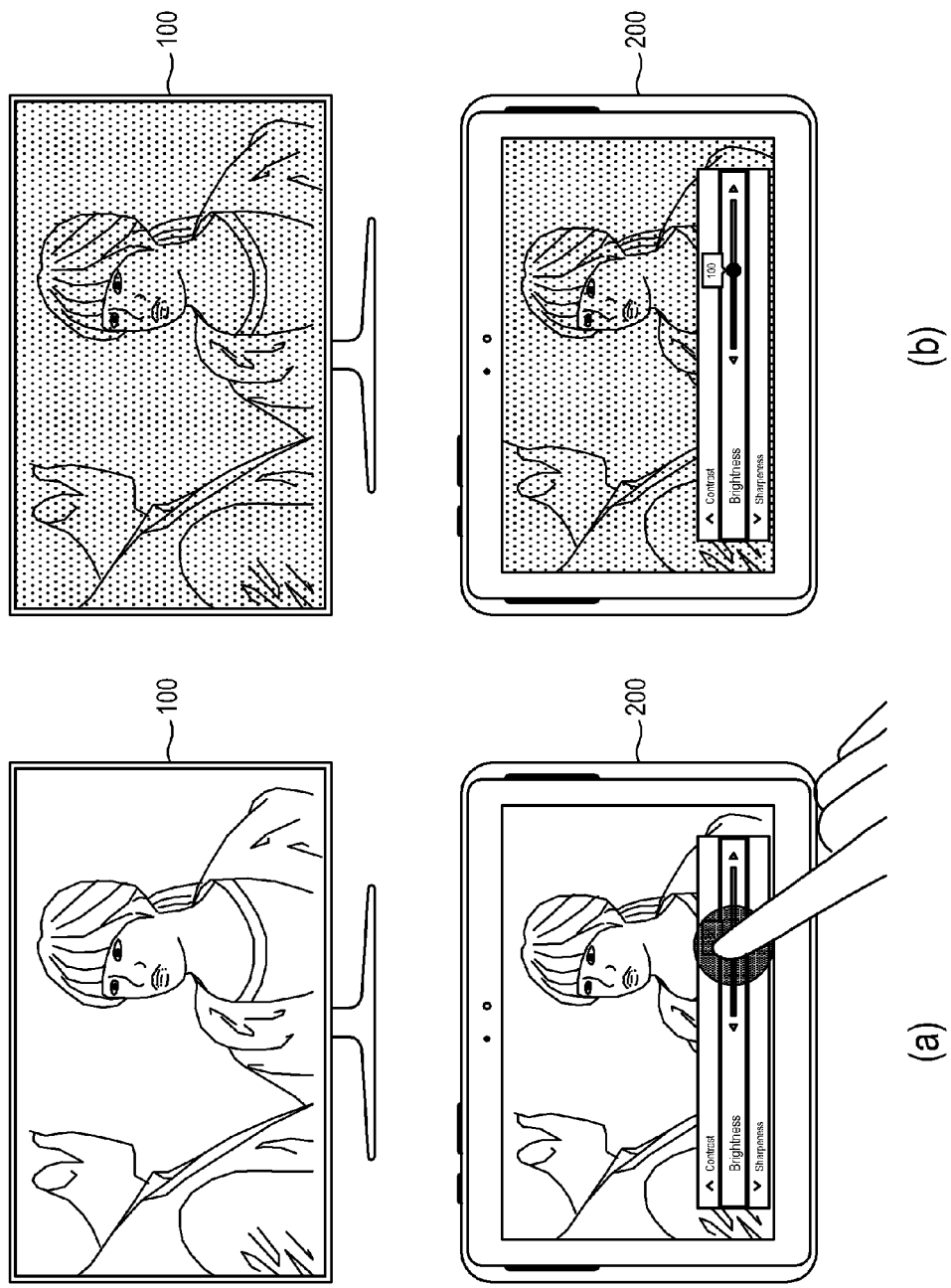

As shown in FIG. 20, brightness setting of a screen may be changed while a user views the smart TV 100. According to an exemplary embodiment, setting about the brightness, contrast, etc. of the smart TV 100 may be adjusted without displaying a menu for changing the setting. On the other hand, the mobile device 200 may display a menu for adjusting the brightness, such that a user may control the brightness, as shown in (a) in FIG. 20. When the brightness control is completed, the smart TV 100 and the mobile device 200 may have adjusted brightness, as shown in (b) in FIG. 20.

There may be a plurality of users of the smart TV 100. In this case, as shown in (a) in FIG. 21, a first user may view a screen of the smart TV 100, while a second user views a different image through a screen of the mobile device 200. When the first user, who watches the screen of the smart TV 100, wants to control the smart TV 100 to display an image being displayed on the mobile device 200, the first user may change an image displayed on the smart TV 100 into the same image as that being displayed on the mobile device 200 through a predetermined operation, e.g., a touch on the screen of the mobile device 200 and a drag in a direction toward the smart TV 100, as shown in (b) in FIG. 21.

Figure 21:
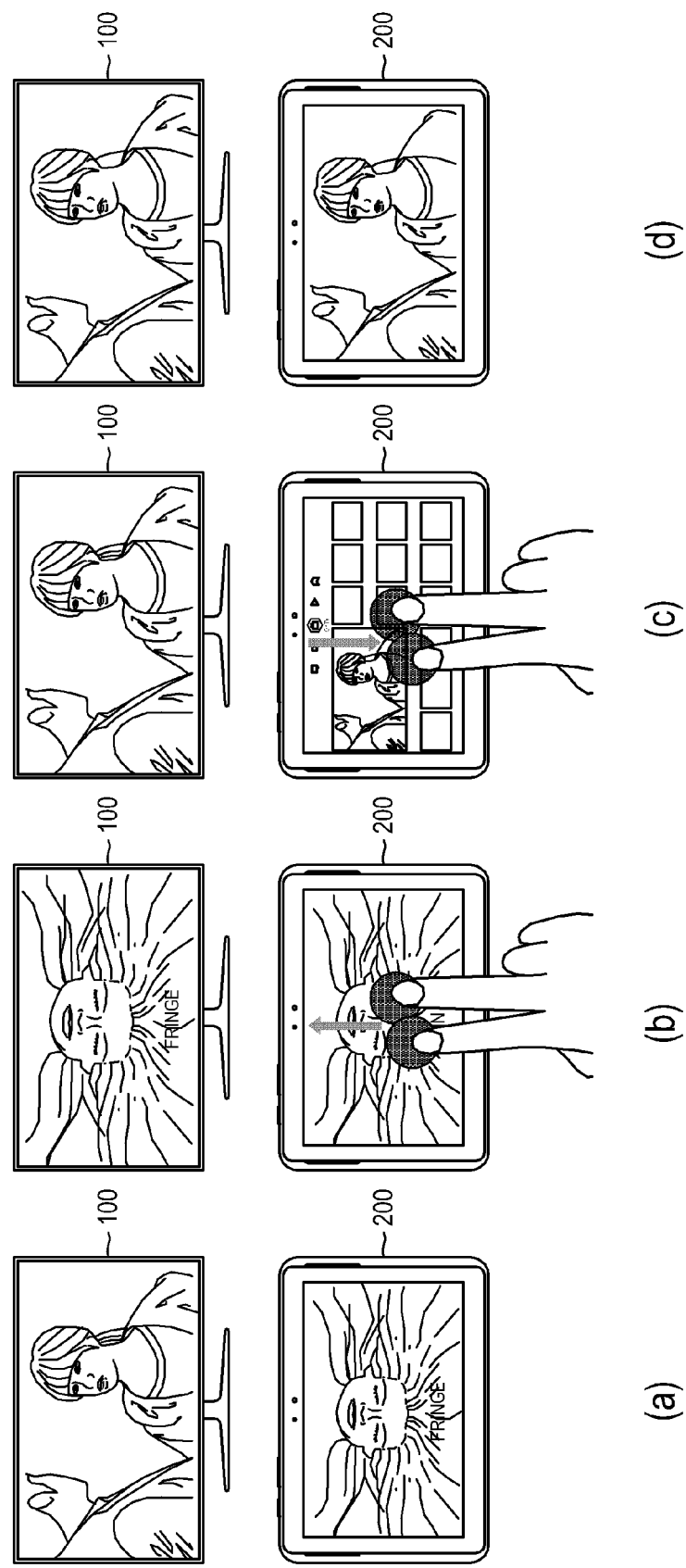

On the other hand, when a touch is performed on the screen of the mobile device 200 and then dragged in the opposite direction, e.g., in a direction away from the smart TV 100 as shown in (c) in FIG. 21, the same image as that being displayed on the smart TV 100 may be displayed on the mobile device 200, as shown in (d) in FIG. 21.

Figure 22:
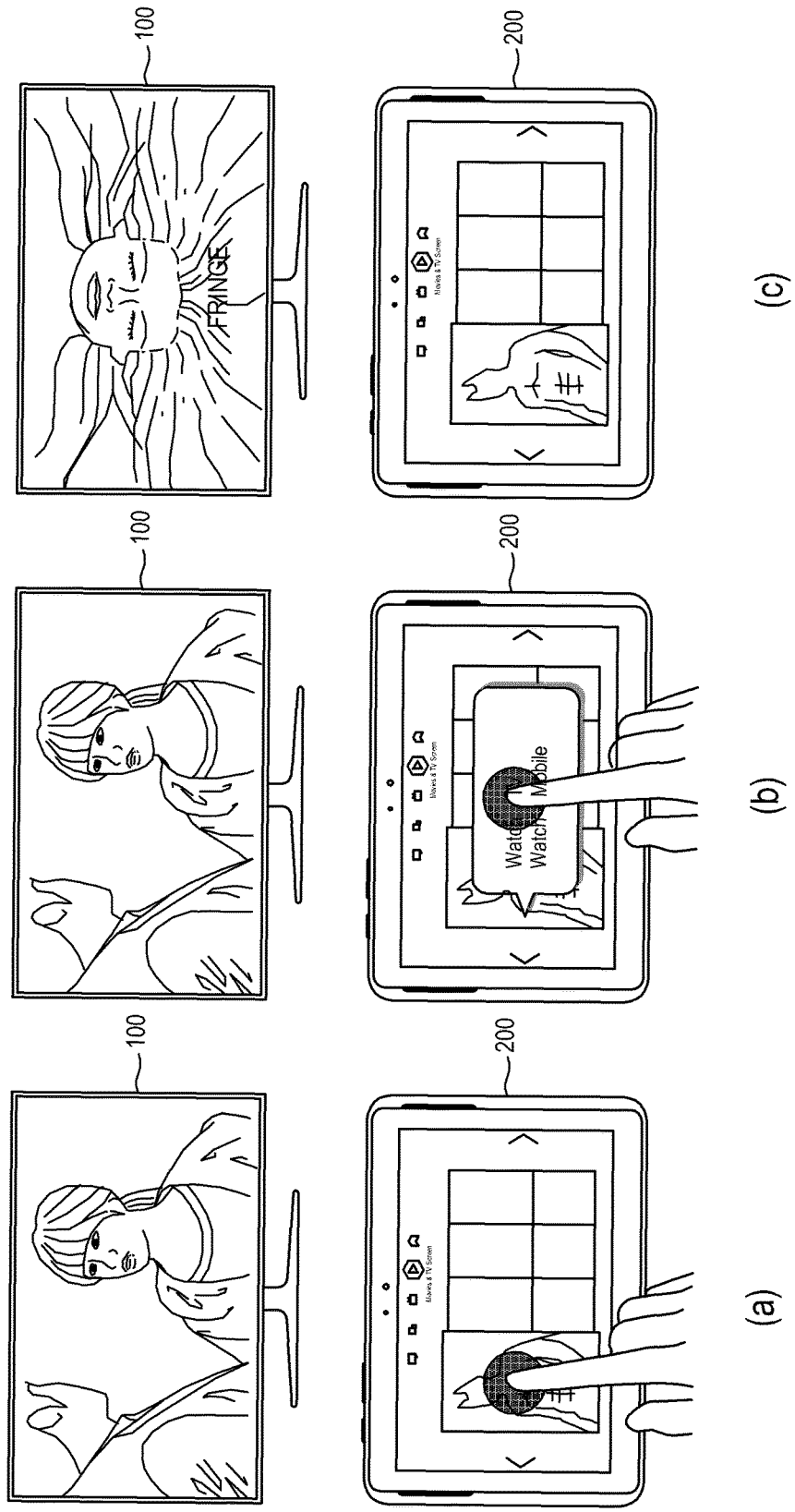

As shown in (a) in FIG. 22, when a user searches for a desired content, e.g., a moving image through a network or the like and touches a moving picture, a UI for selecting one of the smart TV 100 and the mobile device 200 to display the corresponding moving picture is displayed. When the smart TV 100 is selected to display the moving picture, as shown in (b) in FIG. 22, the image being displayed on the smart TV 100 is switched into the desired moving image, as shown in (c) in FIG. 22.

Through the foregoing exemplary embodiments, a user may easily and conveniently perform and change the setting of the smart TV 100, and may adjust and change an image on a screen of the smart TV 100 without interference while watching the smart TV 100.

The application of the mobile device 200 according to exemplary embodiments may not only enable the initial setting of the smart TV to be conveniently performed, but may also control functions of the smart TV. Accordingly, a user may view currently displayed contents such as a moving image or information on the smart TV 100 without interference with a control menu or the application of the mobile device 200.

Also, according to exemplary embodiments, a user may conveniently and easily perform the initial setting of the smart TV 100 through the mobile device 200 through which data (e.g., setting profile data) may be freely input from the user.

Below, a process of performing initial setting of a smart TV according to the initial setting and remote control system of FIG. 4 will be described with reference to FIG. 23.

Figure 23:
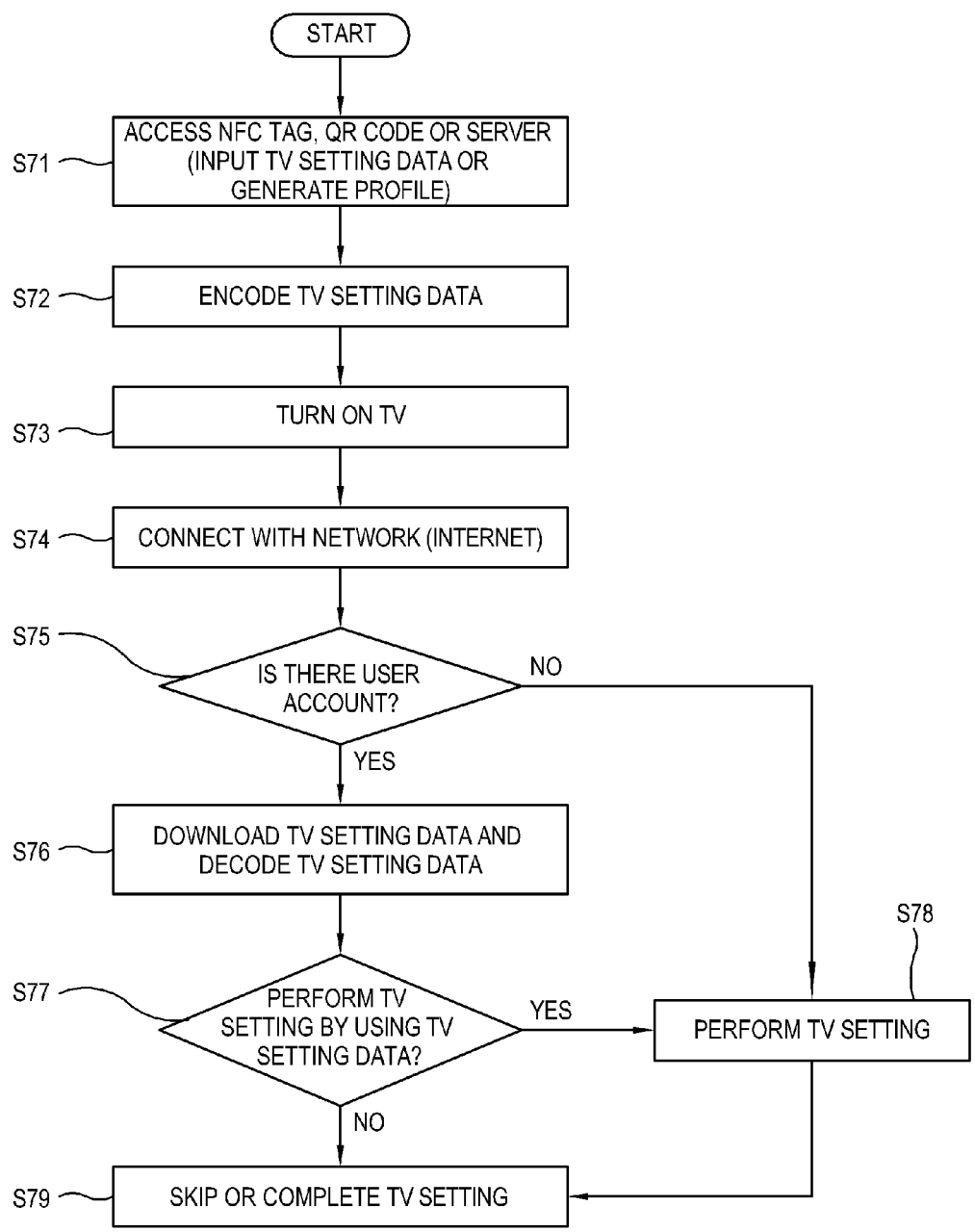
FIG. 23 is a flowchart showing a process of performing initial setting of a smart TV according to the initial setting and remote control system of FIG. 4.

At operation S71 of FIG. 23, the webpage or the application for setting up the electronic device, e.g., the smart TV 100, is received or downloaded by recognition through the information recognizer 260 of the mobile device 200 (e.g., the NFC module or the camera) or by direct access to the server 300. A user may acquire information about the smart TV 100 targeted for setting and server link information from the NFC tag 4 or the QR code 5, or acquire the smart TV information and the server link information by directly inputting URL of the server 300 or an App store server instead of the NFC tag 4 or the QR code.

A user may input the initial setting item for the smart TV as shown in the examples of FIGS. 7 to 12 through the application or the webpage installed or received in the mobile device 200. The initial setting item may include, for example, at least one from among account creation, router (AP) setting, language setting, receiving-type setting, external input-type setting, network-type setting, service-provider setting, agreement to terms and conditions, remote-controller (MBR) setting, etc.

Thus, when the initial setting item of the TV is skipped or the TV setting item is directly selected through the application or the webpage, the TV setting may be skipped by providing a TV setting skip item or performed by the TV setting item selected through the application or the webpage.

At operation S72, a profile about the TV setting item may be encoded, for example, for personal information protection, and be generated as profile images according to user accounts and uploaded to the server 300.

At operation S73, when a user turns on the smart TV to perform the initial setting, at operation S74, the smart TV is connected to the network (e.g., Internet) to access the server uploaded with the setting profile data.

At operation S75, it is determined whether there is a user account exists on the smart TV. When there is the user account, a login screen is provided to allow a user to perform login, and when there is no user account, the TV is directly and manually set up (operation S78).

When there is a user account and the login with the user account is performed at operation S75, the encoded setting profile data previously set up and uploaded for the smart TV is downloaded.

At operation S76, the downloaded setting profile data is decoded.

At operation S77, it is determined whether the decoded setting profile data is used to perform the initial setting of the smart TV.

In this manner, TV setting may be skipped or completed (S79).

Thus, a user may conveniently perform the complicated initial setting of the smart TV through the application or the webpage by using the mobile device 200 or the computer, and the initial setting may be stored in the server 300. Therefore, the initial setting of the smart TV may be automatically downloaded when the smart TV is initially set, thereby simplifying the setting of the smart TV.

Next, the mobile device 200 connects with the smart TV through Bluetooth pairing, Wi-Fi direct, wireless Internet, etc., and, by using the application installed in the mobile device 200 for remotely controlling the smart TV, the mobile device 200 may remotely control the smart TV.

Figure 24:
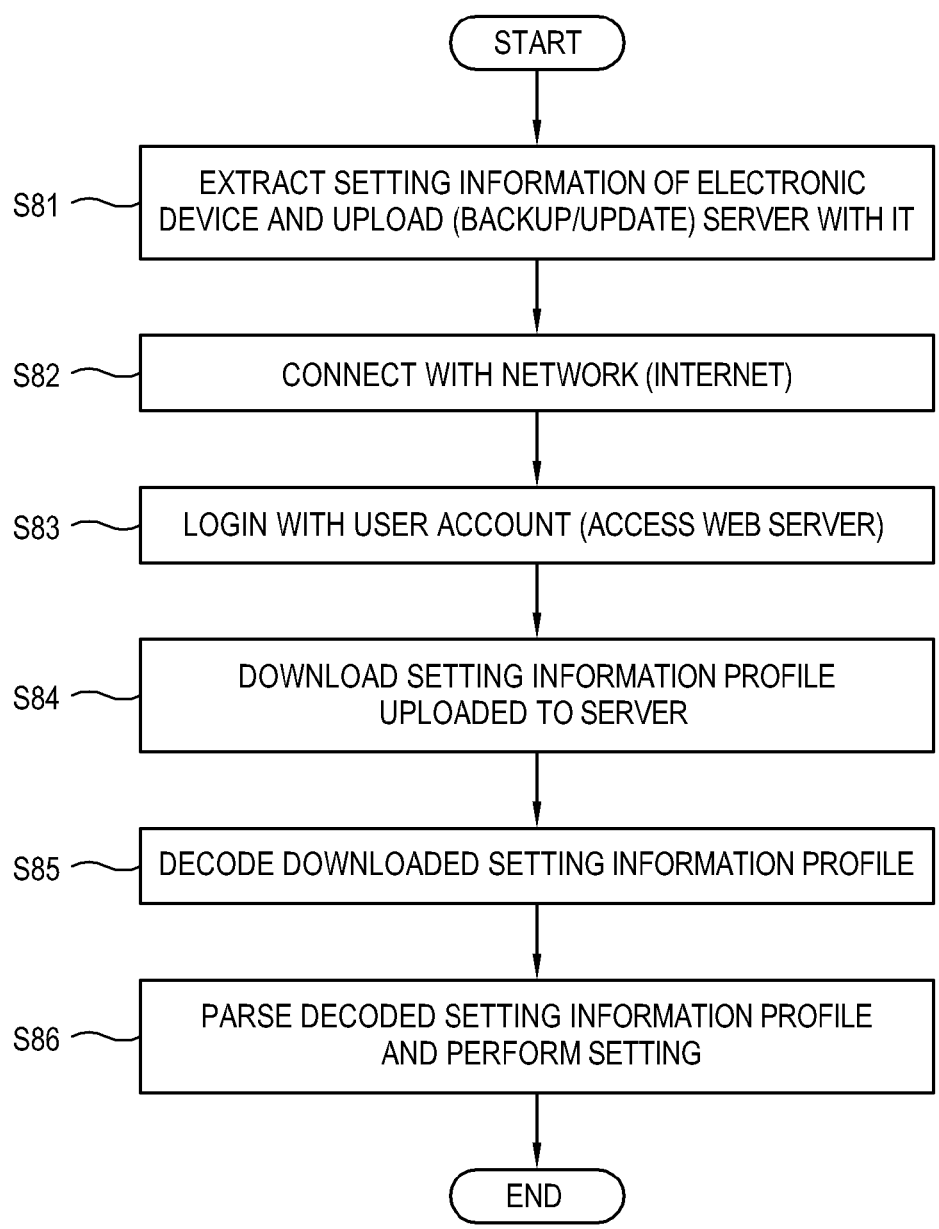
FIG. 24 is a flowchart showing a process of setting up an electronic device according to an exemplary embodiment.

FIG. 24 is a flowchart showing a process of setting up an electronic device (e.g., the smart TV) according to an exemplary embodiment. This exemplary embodiment shows a method of easily and conveniently setting up an electronic device such as the mobile device or the smart TV the setting application when the electronic device is first purchased or replaced by a new device.

At operation S81, a user backs up the setting information for a user's electronic device to the server 300. Here, the setting information to be backed up may include environment setting information such as, for example, information about an installed application, a layout of an application icon, a stored location of the application, a user address, network information (i.e., AP information), or the like. The setting information may be extracted by a setting information extraction (or backup) application installed in the mobile device 200 or the smart TV or the server and generated in the form of the setting profile data. When the setting profile data is generated in the mobile device 200 or the smart TV, this may be transmitted to the server 300 and uploaded according to users and the electronic devices. The setting information backed up to the server 300 may be updated by a user's operation or the setting information extraction (or backup) application of the server 300. The updated setting information may be uploaded in the form of the setting profile data. An updating operation may be performed to change the previously backup setting item into a proper setting item for a new electronic device targeted for setting.

The setting profile data to be uploaded may be encoded, for example, for the personal information protection.

At operation S82, the electronic device 100 for the setting is connected to the network (e.g., Internet) to access the server 300.

At operation S83, a user account login screen is displayed for allowing a user to log in with a user's account to the server 300.

At operation S84, when a user completes the login with the user's account, the electronic device 100 for the setting accesses the server 300 and automatically downloads the uploaded encoded setting profile data.

At operation S85, the electronic device 100 decodes the downloaded encoded setting profile data.

At operation S86, the electronic device 100 parses the decoded setting profile data and performs the setting. Here, information included in the setting profile data may include a layout of an application icon; a stored location of the application, kind and version of the application; an address of a store having the application; whether the application is paid for or free; etc.

During the setting, it may be confirmed by a user whether to install the application. Also, in the case of a pay application, it may be confirmed by a user whether to purchase the application. Further, when there is upper version information, it may be confirmed whether to install an upper version application.

As described above, according to an exemplary embodiment, a user may conveniently and easily download and perform all the environment setting through the setting application provided from the server when a new electronic device is purchased.

According to exemplary embodiments, initial setting of display apparatus may be performed using a mobile device. Further, the initial setting of the display apparatus may be set up without viewing the display apparatus and without limitation as to place or time.

Also, according to exemplary embodiments, a screen being currently displayed on a display apparatus may not be interrupted but fully displayed, while the display apparatus is controlled.

Further, according to exemplary embodiments, when a display apparatus is first purchased or has change in a use environment thereof, the use environment may be conveniently updated to correspond to changed environments through a mobile device.

Exemplary embodiments may also be implemented through computer-readable recording media having recorded thereon computer-executable instructions such as program modules that are executed by a computer. Computer-readable media may be any available media that can be accessed by a computer and include both volatile and nonvolatile media and both detachable and non-detachable media. Examples of the computer-readable media may include a read-only memory (ROM), a random-access memory (RAM), a compact disc (CD)-ROM, a magnetic tape, a floppy disk, an optical data storage device, etc. Furthermore, the computer-readable media may include computer storage media and communication media. The computer storage media include both volatile and nonvolatile and both detachable and non-detachable media implemented by any method or technique for storing information such as computer-readable instructions, data structures, program modules or other data. The communication media typically embody computer-readable instructions, data structures, program modules, other data of a modulated data signal such as a carrier wave, or other transmission mechanism, and they include any information transmission media.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A display apparatus comprising:
   a display;
   a communicator; and
   a controller configured to:
     connect with an external mobile device through the communicator in response to a power on;
     receive a setting profile based on user account information from the external mobile device; and
     perform setting of the display apparatus based on the received setting profile,
   wherein the controller controls the display to display a login screen to allow a user to download the setting profile from the external mobile device,
   wherein the display apparatus provides information relating to the display apparatus to the external mobile device so that the external mobile device transmits the setting profile corresponding to the received information to the display apparatus, and
   wherein the setting profile comprises a plurality of setting items, and when the external mobile device skips at least one of the plurality of setting items, the controller receives a user input on the skipped at least one of the plurality of setting items.

2. The display apparatus according to claim 1, wherein the external mobile device encodes and transmits the setting profile, and the controller receives and decodes the encoded setting profile.

3. The display apparatus according to claim 1, wherein the external mobile device receives information from at least one from among a quick response (QR) code and a near field communication (NFC) tag.

4. The display apparatus according to claim 3, wherein the external mobile device receives location information of the at least one from among a webpage and an application for setting the display apparatus from the at least one from among the QR code and the NFC tag.

5. The display apparatus according to claim 4, wherein the external mobile device comprises a mobile device connected to the display apparatus through at least one from among Bluetooth pairing, Wi-Fi direct and wireless Internet.

6. The display apparatus according to claim 5, wherein the controller controls the display apparatus or performs a presetting of a use environment of the display apparatus in response to a remote control signal received from the external mobile device.

7. The display apparatus according to claim 5, further comprising a storage which is configured to store the application for presetting the use environment of the display apparatus, the application being the same as or compatible with an application installed in the mobile device.

8. The display apparatus according to claim 1, wherein a power on signal from the external mobile device is generated in response to a power control command of the display apparatus received from the NFC tag.

9. The display apparatus according to claim 1, wherein the setting profile is generated based on an input of the setting item by the user of the external mobile device by using a setting item input device, the setting item input device comprising at least one from among a personal computer and a mobile device, and
   the external mobile device comprises a server.

10. A system for setting a display apparatus comprising:
    the display apparatus comprising:
      a display;
      a communicator; and
      a first controller configured to:
        connect with an external mobile device through the communicator in response a power on;
        receive a setting profile based on user account information from the external mobile device; and
        perform setting of the display apparatus based on the received setting profile,
      wherein the first controller controls the display to display a login screen to allow a user to download the setting profile from the external mobile device, and
      wherein the display apparatus provides information relating to the display apparatus to the external mobile device so that the external mobile device transmits the setting profile corresponding to the received information to the display apparatus; and
    a mobile device comprising:
      an information recognizer configured to recognize information from at least one from among a quick response (QR) code and a near field communication (NFC) tag; and
      a second controller to configured to:
        transmit a power on signal to the display apparatus based on the recognized information, and
        transmit the setting profile to the display apparatus.

11. The system according to claim 10, wherein the setting profile is encoded and transmitted to the display apparatus.

12. The system according to claim 10, wherein the information recognizer receives location information of at least one from among an application and a webpage from the at least one from among the QR code and the NFC tag.

13. The system according to claim 12, wherein the application is the same as or compatible with an application installed in the display apparatus.

14. The system according to claim 10, wherein the communicator accesses the display apparatus through at least one from among Bluetooth pairing, Wi-Fi direct and wireless Internet.

15. The system according to claim 14, wherein the second controller remotely controls the display apparatus or remotely sets up the display apparatus by transmitting a remote control signal to the display apparatus.

16. A method of setting up a display apparatus comprising a controller and a display, the method comprising:
  connecting with an external mobile device through a communicator in response to a power on;
  receiving a setting profile based on user account information from the external mobile device,
  performing setting of the display apparatus based on the received setting profile,
  wherein the controller controls the display to display a login screen to allow a user to download the setting profile from the external mobile device,
  wherein the display apparatus provides information relating to the display apparatus to the external mobile device so that the external mobile device transmits the setting profile corresponding to the received information to the display apparatus, and
  wherein the setting profile comprises a plurality of setting items, and when the external mobile device skips at least one of the plurality of setting items, the controller receives a user input on the skipped at least one of the plurality of setting items.

17. The method according to claim 16, further comprising decoding the setting profile transmitted by the external mobile device.

18. The method according to claim 16, wherein the external mobile device receives information from at least one from among a quick response (QR) code and a near field communication (NFC) tag.

19. The method according to claim 18, wherein the external mobile device receives location information of the at least one from among a webpage and an application for presetting a use environment of the display apparatus from the at least one from among the QR code and the NFC tag.

20. The method according to claim 16,
  further comprising accessing the external mobile device through at least one from among Bluetooth pairing, Wi-Fi direct and wireless Internet.

21. The method according to claim 20, wherein a power on signal of the external mobile device is generated in response to a power control command of the display apparatus received from the NFC tag.

22. The method according to claim 20, further comprising controlling the display apparatus or setting up the display apparatus in response to a remote control signal received from the external mobile device.

* * * * *